US010267354B2

(12) United States Patent
Swanson et al.

(10) Patent No.: US 10,267,354 B2
(45) Date of Patent: Apr. 23, 2019

(54) WING FOIL BEARINGS AND METHODS OF MANUFACTURING SAME

(71) Applicant: XDOT ENGINEERING AND ANALYSIS, PLLC, Charlottesville, VA (US)

(72) Inventors: Erik Swanson, Charlottesville, VA (US); Patrick O'Meara, Charlottesville, VA (US)

(73) Assignee: XDOT ENGINEERING AND ANALYSIS, PLLC, Charlottesville, VA (US)

( * ) Notice: Subject to any disclaimer, the term of this patent is extended or adjusted under 35 U.S.C. 154(b) by 0 days.

(21) Appl. No.: 15/960,097

(22) Filed: Apr. 23, 2018

(65) Prior Publication Data
US 2018/0245625 A1     Aug. 30, 2018

Related U.S. Application Data

(63) Continuation of application No. 14/914,981, filed as application No. PCT/US2014/054937 on Sep. 10, 2014, now Pat. No. 9,976,594.

(60) Provisional application No. 61/876,289, filed on Sep. 11, 2013.

(51) Int. Cl.
| F16C 17/02 | (2006.01) |
| F16C 27/02 | (2006.01) |
| F16F 1/02 | (2006.01) |
| F16C 17/04 | (2006.01) |

(Continued)

(52) U.S. Cl.
CPC .......... *F16C 17/024* (2013.01); *F16C 17/042* (2013.01); *F16C 27/02* (2013.01); *F16C 27/04* (2013.01); *F16C 43/02* (2013.01); *F16F 1/028* (2013.01); *F16C 2202/08* (2013.01);
(Continued)

(58) Field of Classification Search
CPC ...... F16C 17/024; F16C 17/042; F16C 27/00; F16C 27/02; F16C 27/04; F16C 43/02; F16C 2202/08; F16C 2220/00; F16C 2220/68; F16C 2220/70; F16C 2220/82; F16F 1/028; Y10T 29/49705
See application file for complete search history.

(56) References Cited

U.S. PATENT DOCUMENTS

| 771,395 A | * | 10/1904 | Robinson | ................ F16C 27/02 |
| | | | | 384/200 |
| 1,107,691 A | * | 8/1914 | Miller | ..................... F16C 27/02 |
| | | | | 384/200 |

(Continued)

*Primary Examiner* — Alan B Waits
(74) *Attorney, Agent, or Firm* — Nixon & Vanderhye, P.C.

(57) ABSTRACT

A wing foil bearing may include one or more wing or tab foil layers. A tab foil layer may comprise a thin material with a two-dimensional array of tab shapes. A tab shape may be defined by a boundary of material separated from the thin material and having an integral edge and a free edge. Tab shapes may include one or more free-state bends relative to the thin material, forming a two-dimensional array of cantilever wings or tabs. Tab arrays may be one or more of various types or two-dimensional arrays, and a tab foil layer may include additional tab arrays and tabs. One or more tab foil layers may be engaged with a mounting surface layer and a counter-surface layer to form a wing foil bearing. Tab foil layers may be stacked and or nested, including partial nesting and complete nesting.

21 Claims, 34 Drawing Sheets

(51) Int. Cl.
*F16C 27/04* (2006.01)
*F16C 43/02* (2006.01)
(52) U.S. Cl.
CPC ...... *F16C 2220/68* (2013.01); *F16C 2220/82* (2013.01); *Y10T 29/49705* (2015.01)

(56) References Cited

U.S. PATENT DOCUMENTS

| | | | | |
|---|---|---|---|---|
| 1,188,518 | A * | 6/1916 | Wilford | F16C 27/02 |
| | | | | 384/200 |
| 1,246,111 | A * | 11/1917 | Kimball | F16C 27/02 |
| | | | | 384/200 |
| 1,283,840 | A * | 11/1918 | McLeod | F16C 27/02 |
| | | | | 384/200 |
| 3,197,243 | A * | 7/1965 | Brenneke | F16C 27/00 |
| | | | | 384/252 |
| 4,208,076 | A * | 6/1980 | Gray | F16C 17/024 |
| | | | | 384/105 |
| 4,227,753 | A * | 10/1980 | Wilcock | F16C 17/042 |
| | | | | 384/105 |
| 4,277,112 | A * | 7/1981 | Heshmat | F16C 17/042 |
| | | | | 384/124 |
| 4,682,900 | A * | 7/1987 | Gu | F16C 27/02 |
| | | | | 384/105 |
| 5,938,341 | A * | 8/1999 | Eccles | F16C 27/08 |
| | | | | 384/105 |
| 2003/0174919 | A1* | 9/2003 | Suh | F16C 17/24 |
| | | | | 384/125 |
| 2014/0376844 | A1* | 12/2014 | Swanson | F16C 27/02 |
| | | | | 384/223 |
| 2017/0191522 | A1* | 7/2017 | Kim | F16C 27/02 |

* cited by examiner

WING FOIL BEARINGS AND METHODS OF MANUFACTURING SAME

REFERENCE TO RELATED APPLICATIONS

This application is a Continuation of U.S. application Ser. No. 14/914,981, filed Feb. 26, 2016, which is a U.S. National Phase of International Patent Application No. PCT/US2014/054937, filed Sep. 10, 2014, now published, which claims priority of U.S. Provisional Application No. 61/876,289, filed Sep. 11, 2013, the contents of these applications are incorporated by reference in their entirety.

FIELD

This application relates to compliant support elements for bearings, and methods for manufacturing compliant support elements for bearings.

BACKGROUND

There are a wide variety of different types of bearings. Common types of bearings include devices that support the rotating shaft in rotating machinery, allowing for continuous rotation. Common examples of this type of bearing include rolling element bearings, oil lubricated bearings, thrust bearings, and active magnetic bearings. Other types of bearings only allow for a restricted range of motion of a supported component or structure. Two common examples of this type of bearing include squeeze film dampers used in rotating machinery and seismic isolator bearings used in large building foundation systems and bridge supports for protection from earthquake motion. Some bearing assemblies, such as compliant foil bearings, themselves contain a bearing element as an integral subcomponent.

The idea of using a relatively compliant bearing to support a relatively stiff bearing has a long history of improving overall system performance. For example, in 1926, Trumpler (U.S. Pat. No. 1,595,744) described a series of flexible support systems applied both to rolling element (ball) bearings, as well as hydrodynamic radial bearings. These flexible support systems were described as being soft enough to allow the shaft to rotate around its mass center, thus accommodating variable unbalance distributions. Trumpler's flexible mount is described as also using oil filled spaces which are squeezed as the shaft orbit to provide damping. Over time, support bearings using oil filled clearance spaces used for rotating machinery have come to be known as "squeeze-film dampers."

This idea of a soft mount with squeeze film damping is now very widely used [Vance, 1988], most notably in nearly every modern aircraft gas turbine engine. The low stiffness of squeeze film dampers allow engineers to place rotor-bearing system natural frequencies (often referred to as "critical speeds") at frequencies well below the normal running speed range, while simultaneously providing enough damping to ensure that dangerous vibration amplitudes do not occur as the shaft rotating speed traverses through these frequencies. Squeeze film dampers are also sometimes used to reduce unstable whirling motions in high speed rotating machinery.

Conventional oil lubricated squeeze film dampers have multiple drawbacks. One major issue is their limited operating temperature range. Conventional oil lubricants cannot be used at temperatures much over about 450 degrees F. without experiencing chemical degradation or potentially catching fire. At very low temperatures, oils can become extremely viscous and lose the ability to flow easily. Another drawback to conventional squeeze film dampers in some applications is the need for a constant supply of lubricating oil. Many smaller machines that would benefit from squeeze film dampers use grease lubricated bearings. Thus there is no oil supply to allow a conventional oil-lubricated squeeze film damper to be employed.

Salahi, Heshmat and Walton (2007) discuss using a frictionally damped metallic spring element as a compliant support bearing as an alternative to the conventional squeeze film damper. They report that a frictionally damped support structure offers high levels of performance in this application without the drawbacks of oil. However, the compliant support element they present contains numerous small, precision formed parts which must be precisely assembled with spot welds. This construction is costly and difficult to produce.

The frictionally damped bearing element that Salahi et al. propose as a squeeze film damper replacement was originally developed as a flexible support bearing integrated directly into a gas lubricated compliant hydrodynamic bearing assembly. Gas lubricated hydrodynamic bearings with an integrated compliant bearing element have been around since at least the mid 1960's. One early example is a 1965 patent issued to Marley (U.S. Pat. No. 3,215,480). This patent describes a gas lubricated hydrodynamic bearing which uses a concentric array of flexible thin foil strips supported at the ends, and loaded in the center as the flexible non-rotating bearing component. During operation, hydrodynamic pressure is generated in the lubricant film (typically air) between the shaft and top foil(s) as the shaft rotates at high speed in the direction of a converging clearance between the top foil(s) and the shaft. The hydrodynamic pressure acts to separate the shaft and flexible bearing surface, and support the weight of the rotating component.

Since their development in the 1960's, the complexity and design sophistication of foil bearing designs have steady increased in the pursuit of increased performance with regards to load capacity and the bearing's effects on rotor-bearing system dynamics.

One of the first advancements in the design of foil bearing integral flexible support bearing elements was to use multiple spring elements along the length of the bearing assembly. Dellacorte and Valco (2000), for example, shows two flexible support elements which have an axially split strip of corrugated bump foils. This axially split construction improves the bearing's ability to handle misalignment. It also makes it possible to vary the support element stiffness in the axial direction. For example, it is thought to be advantageous to have a lower stiffness near the top foil edges. Other foil bearing developers have proposed using variable pitch bumps and/or heights in the flexible element to achieve circumferentially varying stiffness. An example of this approach is described in U.S. Pat. No. 4,262,975. This patent also presents axially split bumps and an additional "stiffener" foil between the top foil and the bump foils. Although the bearing using this flexible support assembly is described as having very high levels of performance, the support assembly is quite complex. As with most bump foil based configurations, the disclosed configuration relies on interconnected arch forces to support the load, it thus has the drawback that there is interaction between the forces applied to one bump, and deflections of other bumps in the strip. There is no localized load-bearing capability. For long strips of bumps, such as disclosed in FIG. 3, friction forces can build up and prevent some of the bumps from sliding. This reduces the ability of the bump strip to dissipate vibrational energy through friction.

U.S. Pat. No. 4,300,806 describes a configuration using staged multiple nested stiffness elements with gaps to achieve a nonlinear stiffness characteristic that hardens with increasing load. This approach is described as improving overall bearing performance by having a low stiffness support element at low speeds and loads, then an increasing stiffness support element at higher speeds and loads. This flexible support element is complex to produce, since it has numerous precision formed subcomponents.

U.S. Pat. No. 4,315,359 describes a foil thrust bearing compliant support that uses a one dimensional circumferential array of "flaps" formed towards the top foil, which is cooperatively engaged with a disk-like feature on the rotating shaft. It is indicated that an object of the patent is to provide a compliant fluid film thrust bearing which permits the top foil to deform locally, without affecting the pad height at other locations. It also suggests that the required manufacturing tooling is economical to produce. Two significant drawbacks of the proposed bearing are that it requires welded components, and the "flaps" are not split into multiple sections or two-dimensional arrays to more readily accommodate misalignment and provide for localized load-bearing capabilities.

U.S. Pat. No. 4,699,523 describes a radial foil bearing wherein a bearing foil is retained in an axial profiled slot machined into the wall of the bearing housing. This approach avoids the need to use spot welds that are often used for this purpose.

U.S. Pat. No. 5,116,143 describes a radial bearing with compliant support element stiffness for a radial foil bearing which uses a one-dimensional circumferential array of "curvilinear support beams" that vary in width and pitch to optimize the support stiffness distribution. The support beams are envisioned as extending nearly the entire axial length of the bearing, precluding the ability to provide localized load-bearing capabilities. Small cutouts at the ends of the beams are used to provide a reduced stiffness at the edges of the bearings. As noted previously, a drawback of this construction is that a single spring element extending the entire length of the bearing has a limited ability to accommodate misalignment or local deformations in the bearing.

U.S. Pat. No. 5,427,455 presents a compliant support element with small cantilever beams which are created when a foil with specially shaped cutouts forced into a circular shape to fit into a bearing housing. This compliant support element and the resulting radial foil bearing partially address some of the drawbacks identified above. The advantages include:

1. It is possible to vary to the support stiffness both axially and circumferentially.
2. The support element can readily accommodate misalignment and local deformations, since multiple spring features are used axially.
3. No welds are required to assemble the bearing.
4. The spring element is economical to produce.

However, this compliant support element has some important drawbacks. Most notable is that it cannot be used for anything other than a radial bearing, because the cantilever beams are formed only when the foil layer is fixed into a cylindrical shape. A generally planar thrust bearing, for example, is not feasible. Even from the perspective of a radial bearing, it does not allow the designer to vary the angle and distance between the cantilever beam spring and the stationary counter-surface which supports the tabs in any meaningful way, because the cantilever beam springs are created as a side effect of the compliant element being bent into a circular shape, rather than as an explicitly formed profile. Thus, the configuration has a limited ability to provide localized load support and/or stiffness. The need to force the support element structure into a circular shape also tends to result in a bearing with either an undesirably large amount of radial force (preload) between the shaft and the top foil, and/or requiring retainers which prevent the spring element from springing back towards a flat shape to be included in the bearing housing's inner profile. It is also difficult to produce a reliable, practical bearing with less than three pads. This limits the achievable load capacity for this configuration, because three-pad compliant foil bearings tend to have less load capacity than one or two pad designs.

U.S. Pat. No. 5,938,341 presents a generally planar foil thrust bearing support which uses a one-dimensional circumferential array of formed spring tabs to apply axial preload to a bearing. The objective of the assembly is to be a preload spring, rather than a support spring for the operating surface of the bearing. The use of the preload springs as a means to dissipate vibrational energy is not discussed in this patent. The patent does not envision a large number of spring tabs, or multi-dimensional arrays of tabs, as would be required to support the top foil surface of a compliant foil bearing. The patent is also silent on varying tab shape, height, bend angle(s), etc.

U.S. Pat. No. 8,360,645 presents a foil bearing support structure which is quite similar to U.S. Pat. No. 5,116,143, except that the cantilever beams or flaps are formed by folding/pleating the foil, rather than with cutouts and tabs that are bent into the required shape. It suffers from the same disadvantages as U.S. Pat. No. 5,116,143.

DellaCorte and Valco (2000) summarized much of the progress in foil bearing compliant support design by dividing radial foil bearings into three groups:

1. "Generation I" bearings, which have a more or less uniform support stiffness distribution.
2. "Generation II" bearings, which have support stiffnesses that vary in either the circumferential or axial direction.
3. "Generation III" bearings, which have support stiffnesses that can vary in both the circumferential and axial directions, as well as possibly nonlinear stiffness with load characteristics.

Generation I bearings often have the lowest performance, while Generation III bearings often have the highest performance. The major difference between these three groupings is the flexible support element(s). In general, contemporary Generation III bearings are more complex with more subcomponents and would often be expected to be more expensive to design and produce.

Thus, although a large number of compliant supports for foil bearings have been proposed, contemporary compliant supports suffer from several disadvantages, including:

1. Many configurations use compliant elements which extend the full length of the bearing top foil. Full length compliant elements limit the compliant support element's ability to accommodate misalignment or localized deformations of the bearing or rotating shaft.
2. Most configurations have limitations with regards to independently and arbitrarily varying the support element stiffness spatial distribution.
3. Some configurations are only suitable for either generally circular or generally planar bearings, but not both.

4. As they are typically implemented and produced for radial foil bearings, many configurations have constant height bumps. This approach limits the bearing designer's ability to create an initial bearing clearance profile which has one or more converging wedge regions for a centered shaft. This preload is well known to often improve stability in rigid surface (fixed geometry) hydrodynamic radial bearings. The preload may also be beneficial in compliant surface bearings.

5. Most configurations require numerous parts that must be precisely formed, and accurately assembled with tolerances on the order of 0.0001 inches, often with multiple spot welds. The large number of parts, need for spot-welding, and required assembly tolerances tend to make these designs expensive and inherently unsuitable for high volume production.

SUMMARY

The present disclosure generally relates to wing foil bearings, and in particular wing foil layers used in wing foil bearings. A wing foil bearing based on one or more multi-dimensional array(s) of compliant support elements based on multiple formed cantilever "wing" tabs provides an improved bearing. The "wing" tab shapes can be optimized in numerous ways to achieve desirable bearing characteristics and provide localized load-bearing and stiffness properties. Example optimizations include various bends, bend angles, twists, overall profiles and shapes, lengths, widths, cut out regions, thicknesses, tab array formations, and tapers. Embodiments may feature multiple layers and/or nested sets of wing tabs. Embodiments may combine multiple materials with a layered structure, including the use of coatings. The clearance spaces defined by a wing tab and adjacent surfaces may be partially or fully filled with other materials, including, for example, liquids, elastomers, gels, etc. These and other features may be used, for example, to achieve desired height, stiffness and/or vibrational energy dissipation spatial distribution, overall weight, etc.

When cooperatively engaged between two surfaces, the wing foil layer provides supporting stiffness and numerous sliding interfaces which dissipate vibration energy induced by relative motion of the various surfaces though friction. Wing foil bearings can be readily and economically manufactured using a variety of simple and cost-efficient manufacturing techniques, and are especially well suited for large scale manufacturing.

The wing foil layer is also well suited for supporting rotating machinery bearings. It is especially well suited for use as the bearing used to support the deformable operating surface within a compliant foil bearing for rotating machinery applications. In addition to these rotating machinery applications, the wing foil layer may be used in a wide range other applications where a compliant locating interface with vibrational energy dissipation capability between two surfaces may be beneficial. Some examples include shock and vibration mounts, hip joints, aircraft and watercraft hulls, propulsion and power generation machinery, turbochargers, microturbines, blowers, compressors, high speed motors, machine tools, automotive acoustic management, exhaust systems, manned and unmanned vehicles, meso, micro and nano-scale devices, robotics, to name a few potential applications for wing foil bearing systems.

As described herein, a wing foil bearing may include a mounting surface layer, one or more wing or tab foil layers, and a counter-surface layer. The tab foil layer may comprise a thin material with a two-dimensional array of tab shapes.

A tab shape may be defined by a boundary of material separated from the thin material and having an integral edge and a free edge. Tab shapes may include free-state bends relative to the thin material at or near the integral edge, forming a two-dimensional array of cantilever wings or tabs. Bends may be formed by bending the tabs, or by manufacturing the tab foil layer with the desired bends. The tabs may have the same or different free-state bend angles. Tabs may also include additional free-state bends, such as a reverse bend near the free edge to create a foot. In addition to bends, tabs may be twisted and configured in numerous profiles. Tabs may be formed in pairs having common integral regions, and tab pairs may have multiple possible configurations. Tabs may have spaced apart regions along integral edges, allowing for additional tabs within a tab. Tabs may have one of many possible configurations, and may also have different heights and lengths.

Tab arrays may be one or more of various types or two-dimensional arrays, such as a regularly spaced array, an irregularly spaced array, a rectangular array, a square array, a rhombic array, a hexagonal array, a parallelogrammic array, a triangular array, and a circular array. In addition to a two-dimensional array of tabs, a tab foil layer may include additional tabs. Additional tabs may include single rows and additional arrays, and may include free-state bends in opposite directions as other tabs. As a result, a tab foil layer may have tabs on both sides of the thin material.

A tab foil layer may be cooperatively engaged with the mounting surface layer, and the counter-surface layer may be cooperatively engaged with all or a portion of the first two-dimensional array of cantilever tabs. The bearing may be a generally flat planar bearing, a generally curved planar bearing, a generally cylindrical bearing, a generally conical bearing, a generally spherical bearing, and a generally hemispherical bearing, as examples. Multiple tab foil layers may also be stacked and or nested, including partial nesting and complete nesting.

Tab foil layers may be manufactured using one or more methods. For example, stamping, chemical etching, electrical discharge machining, laser, and water jet processes, may be used to form tab shapes. As another example, a casting process, a molding process, an electroforming process, an additive process, and a 3-D printing process, may be used to form tab foil layers.

DETAILED DESCRIPTION

This application relates to compliant support elements for bearings, and methods for manufacturing compliant support elements for bearings. One of ordinary skill would understand that the concepts and features described herein may be applicable in a number of bearing types and for a number of bearing applications. For example, embodiments may take the form of a compliant foil bearing including one or more wing foil (interchangeably referred to as "tab foil") layers. As another example, embodiments may take the form of a rolling element bearing including one or more wing foil layers as damper elements. Other embodiments may take the form of a shock or vibration mount, and may include one or more wing foil layers as a mount.

Figure 1:
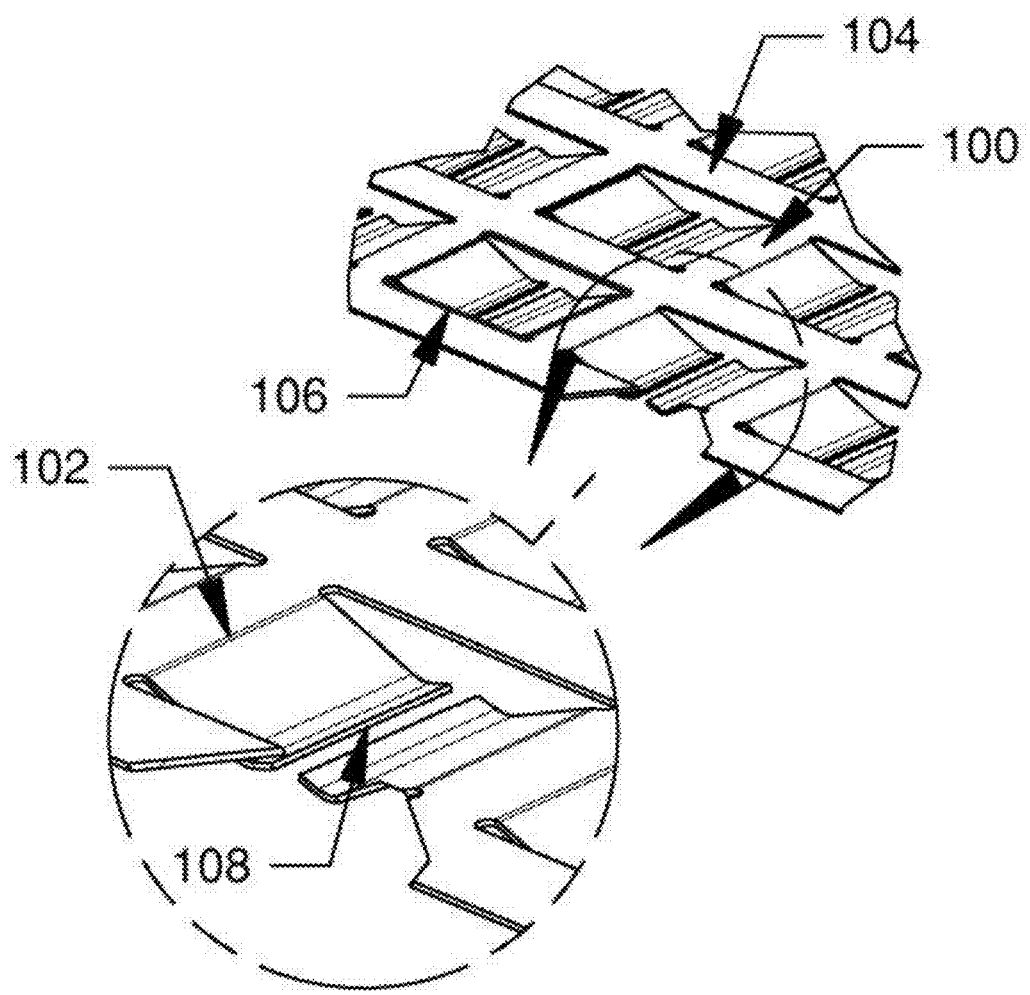
FIG. 1 shows an enlarged view and partial cutaway of an embodiment of a generally planar wing foil layer.

FIG. 1 shows one embodiment of a generally planar wing foil layer with a two-dimensional array of profiled cantilever tabs formed from a thin strip of material. The wing foil layer may be incorporated into a bearing, such as a compliant foil bearing or a thrust bearing, as described elsewhere herein. The thin strip of material may be metal, plastic, ceramic, composite, or any other reasonably stiff material which can formed or produced in such a way as to achieve the desired array(s) of free-state profiles for the wing foil tabs. The term "free-state" describes a profile that exists in the absence of any external forces being applied to the wing foil bearing, such that the tab has a desired position and shape relative to the remainder of the thin material. A free-state profile typically consists of one or more "bends" made to a tab, such that the tab has a desired profile when at rest, i.e., in an unloaded state, either as a separate wing foil layer, or when installed as part of a bearing but not receiving an external load. A bend may be formed by physically bending the tab such that it takes a desired free-state profile, or by manufacturing the material to include the desired bends, such as through three-dimensional (3-D) printing or a casting process. The thin strip of material may be constant thickness, or the thicknesses of a plurality of regions of the thin strip of material may be different. The tabs are attached to the thin strip of material by a web 100, and may be formed by separating the tab shape from the thin material, or forming the thin material with the desired tab shapes (e.g., 3-D printing). Each tab shape has at least one integral portion 102 that remains integral with the thin material and attaches to the web region 100. The web regions 100 are connected via strips 104 which form a frame to hold the overall structure together. The edges of frames and webs also define a window region 106 that is formed when the tabs are bent away from the thin foil material. Each tab also has a free edge 108, which is substantially opposite the integral portion 102 in the embodiment shown. In other embodiments, the tab shape and profile shape may cause the free edge 108 to be in closer proximity to the integral portion 102, such as through additional bends, reverse bends, and twists, for example. The embodiment in FIG. 1 includes profiled tabs arranged in a two-dimensional and regularly-spaced array, and the array features generally symmetric tab pairs. As described elsewhere herein, embodiments may feature one or more arrays of tabs, and the types of array(s) may vary. Variations in tab shape, profile shape, and array may be made to provide localized stiffness control and/or load-bearing changes.

Figure 2:
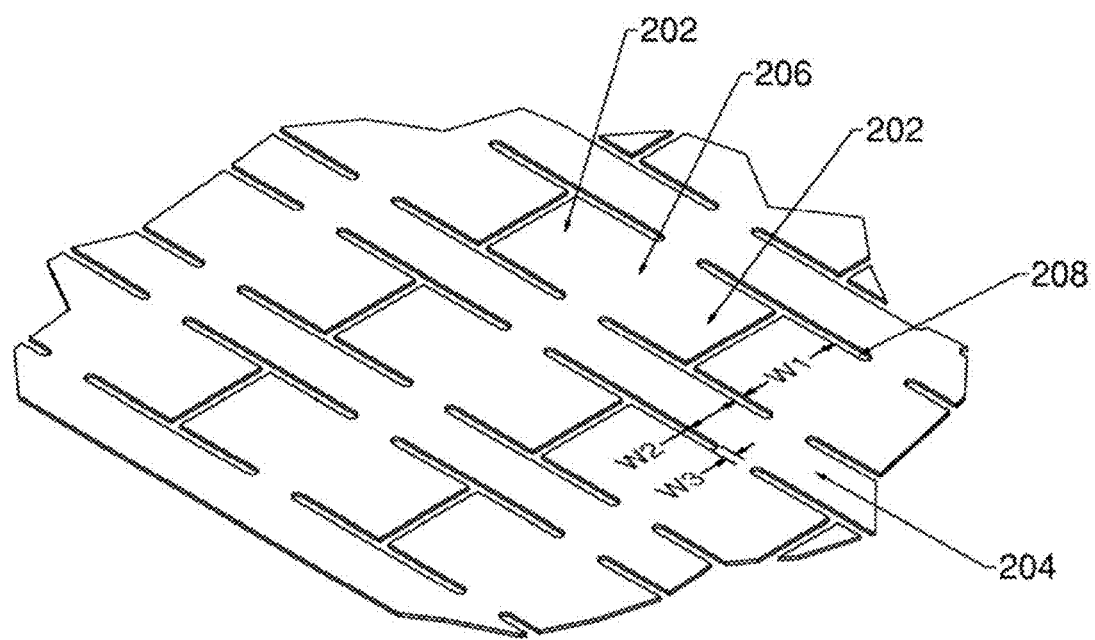
FIG. 2 depicts one embodiment of a wing foil blank after separating tab shapes from the surrounding material.

FIG. 2 shows a portion of a thin strip of material with tab shapes that may be used for a one wing foil layer embodiment, prior to forming the desired profile and two-dimensional wings or tabs. The embodiment in FIG. 2 features a two-dimensional and regularly-spaced array of tab shapes separated from the thin material. The tabs 202 of width W1 have been separated from the thin strip, but remain attached at the web region 206. The webs are connected via strips 204 of width W2 which form the frame to hold the overall structure together. For some methods of production, there is also a small gap 208 of material with width W3 which has been removed around the wing foil tab shapes. This wing foil blank may be readily manufactured from a thin strip of material using a variety of common processes. Examples of processes suitable for manufacturing wing foil bearings described herein include, by way of example only, chemical etching, electrical discharge machining, laser or water jet cutting. The wing foil blank can also be formed via a stamping operation, either as a separate operation, or as part of the forming step which bends the wing foil tabs to the desired profile. Other approaches are also possible, such as, for example, casting, molding, electroforming, and additive processes (i.e., "3-D printing"), although the intermediate product shown in FIG. 2 might not be required in such processes. For example, a 3-D printing process could produce the wing foil layer, in which the tabs are manufactured with the desired free-state profile, as opposed to forming tab shapes as shown in FIG. 2 and subsequently forming the desired free-state profile through, as an example, a bending or stamping process.

Figure 3:
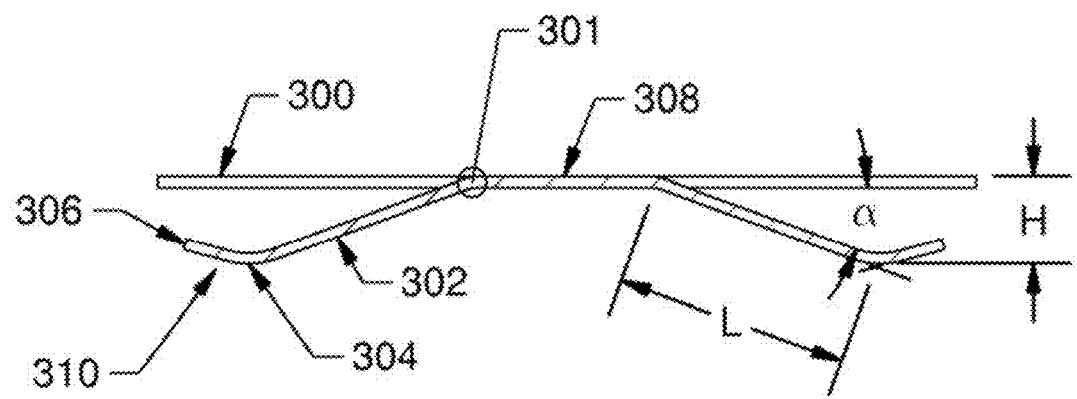
FIG. 3 is a cross-sectional view of one embodiment of a pair of wing foil tabs according to an embodiment of the present approach.

FIG. 3 shows a cross-section through one embodiment of a portion of a wing foil layer. As shown in this embodiment, a wing foil bearing consist of a two-dimensional array consisting of a plurality of tabs bent in the same direction relative to the material 300, formed by separating the tab 302 from the surrounding material 300, the creating a first free-state bend at or near integral portion 301 to obtain a free-state bend angle of a of between 1.0 and 180.0 degrees when no external forces are applied to the wing foil layer. For other embodiments produced by a process such as 3D printing or casting, the equivalent cantilever tab may be directly produced with the desired free-state bend angle without an explicit bending operation, but for simplicity the profile is referred to as having one or more bends. The optimal first free-state bend angle to achieve a good balance between mechanical stresses, cantilever bending stiffness and frictional vibrational energy dissipation, is in the range of 20 to 55 degrees for most applications. However, other embodiments and some applications may have a larger or smaller optimal range. Optionally, one or more tabs may include a second free-state bend 304. In the embodiment shown in FIG. 3, the second free-state bend 304 is bent in a second direction relative to the thin material to achieve a reverse free-state bend, thereby forming a foot at the distal end of the tab. The foot not only serves to more precisely define the free-state cantilever tab height H (the effective distance between the thin material 300 and the contact point of the tab in the free-state) and tab length L (the length of the tab between the bends shown in the embodiment), but also provides a more suitable region of the tab to cooperatively engage with a counter-surface than the free edge 306 of the distal end of the tab. The surface 308 of a wing foil bearing comprising the surfaces of the web and frame regions that are opposite the side where the tabs protrude, is defined to be the frame/web surface. The surface 310 of the tab that are on the opposite side of the tab from the frame/web surface, are referred to herein as the tab surfaces.

In the embodiment shown in FIG. 3, free-state or effective height H may be varied within the two-dimensional array by changing one or more of the length of the tab between the first free-state bend and the foot, the bend angle α, and/or the thickness of the thin material. As described below, multiple free-state bends may also be used to vary not only the height of the cantilever tab, but also the profile shape. As one of ordinary skill would appreciate, variations in these design parameters may be used to optimize a wing foil bearing to achieve a variety of design goals including for example and without limitation, the bending stiffness of the tabs, the path traced by the various points on the tab when the wing foil bearing is compressed between two surfaces as described below, the sliding friction characteristics, the contact forces between a wing foil bearing and a mounting surface or counter-surface, and/or the heights of various regions of the wing foil bearing.

Figure 4:
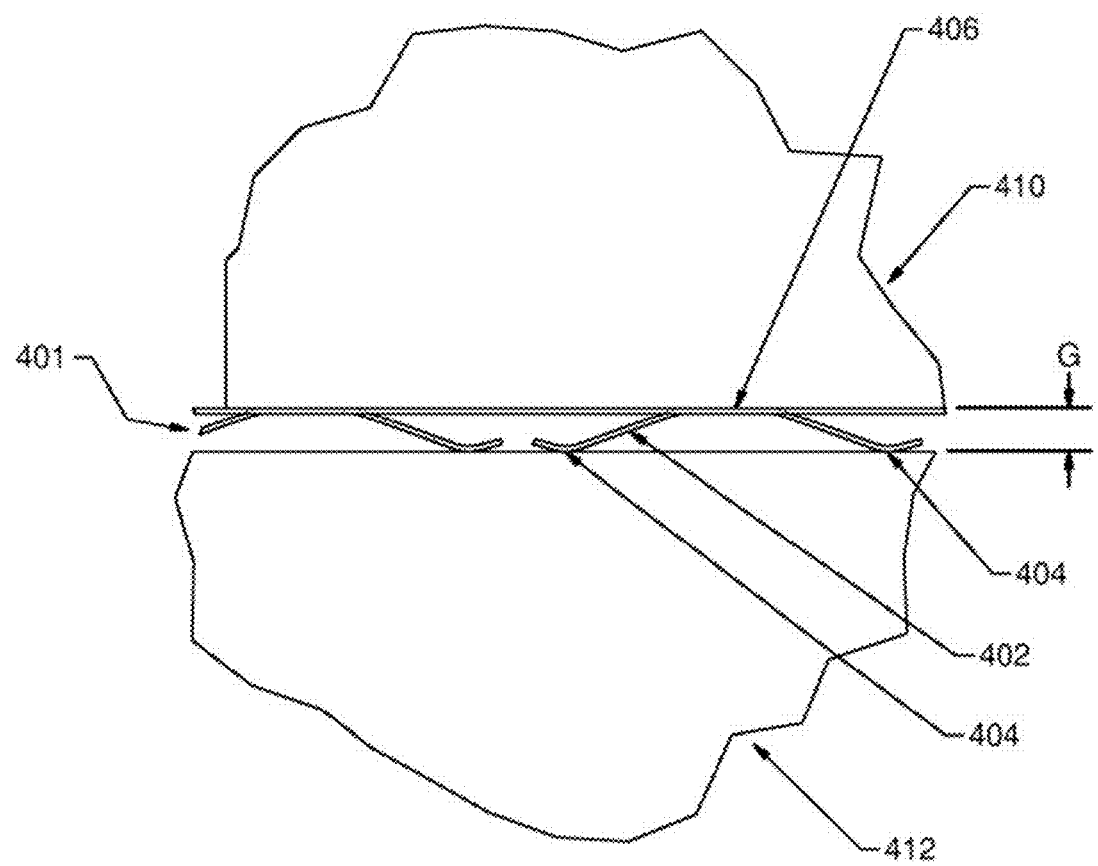
FIG. 4 is a cross-sectional view of an embodiment of a pair of wing foil tabs cooperatively engaged with a mounting surface and a counter-surface.

FIG. 4 shows an embodiment of a wing foil layer 401 cooperatively engaged with two surfaces 404 and 406 that can move relative to each other such that the gap between the surfaces varies over time so as to deflect the cantilever tabs 402 of the wing foil layer 401. As one of ordinary skill would appreciate, deflections of the tabs will generate corresponding reaction forces between the wing foil layer 401 and the surfaces 404 and 406, and may also cause the frame and/or web regions of the wing foil bearing to deform. Surface 406, located on body 410, may be considered a mounting surface that is cooperatively engaged with the frame/web surface of the wing foil bearing. Surface 404, located on body 412, may be considered a counter-surface that is cooperatively engaged with the tab surface of the wing foil bearing. The mounting surface 406 and counter-surface 404 may be profiled such that the gap G between them varies over different portions of the wing foil bearing. In some embodiments, the gap between the mounting surface and counter-surface in the assembled state may be less than the free-state height of the wing foil bearing, such that there may be an initial preload deflection of at least some of the wing foil cantilever tabs. Different regions of the mounting surface 406 and counter-surface 404 may move in different ways and with different time histories. In some embodiments, the mounting surface 406, or counter-surface 404, or both, may also slide in a direction substantially parallel to the cooperatively engaged surface. The mounting surface 406 and counter-surface 404 may have a wide variety of geometric forms to suit application requirements. Some embodiments for a wing foil bearing are generally planar, such as, for example, in the planar bearing embodiment as shown in FIG. 3. Other embodiments may be generally cylindrical, such as the wing foil bearing embodiment shown in FIG. 6. The ability of the wing foil bearing to be readily produced in a wide range of geometric arrangements is a significant advantage of over prior art. This design flexibility allows a wing foil bearing to be applied to a broader range of applications, and specifically tailored to meet engineering needs.

Figure 5:
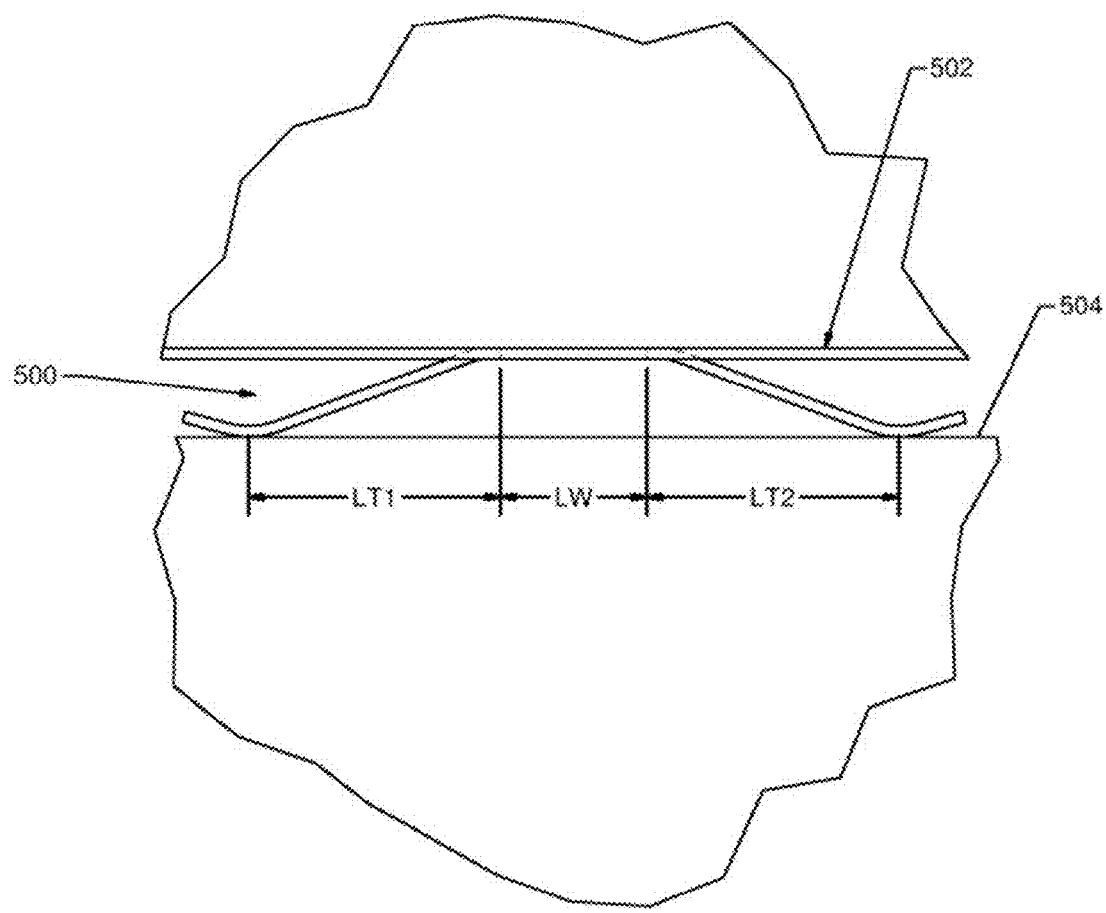
FIG. 5 is a cross-sectional view of an embodiment of a pair of wing foil tabs according to the present approach.

FIG. 5 shows one embodiment of a wing foil layer (00) cooperatively engaged with a mounting surface 502 and a counter-surface 504. For this embodiment, LT1 is the effective length of a first cantilever tab, LT2 is the effective length of a second cantilever tab, and LW is the effective length of the web region. Length LT1 is defined by the distance from the point where the distal end of the integral portion of the first tab initially contacts the counter-surface 54, to the point where the web region adjacent to the integral portion of the tab initially contacts the mounting surface 502. Length LT2 is defined by the distance from the point where the distal end of the integral portion of the second tab initially contacts the counter-surface 504, to the point where the web region adjacent to the integral portion of the tab initially contacts the mounting surface. LW is defined as the distance between the adjacent endpoints of LT and LT2. In other embodiments, the wing foil layer profile may be such that the point of contact between the mounting surface and the wing foil layer defining the endpoint of LT1 and/or LT2 occurs on the integral portion of the corresponding tab. For some embodiments, LT1 may not be the same as LT2. As would be appreciated by one of ordinary skill, these lengths, in combination with the free-state bend angles, the thickness(s) of the thin material, and the profile may be varied to change certain properties either locally or across the entire layer, such as the stiffness of the wing foil layer. They also may be varied to change the characteristics of the sliding friction between the wing foil tab and the counter-surface. For example, if the embodiment shown in FIG. 4 were modified by maintaining the same gap between the mounting surface and the counter-surface, but increasing the effective length of each tab, the frictional vibration energy dissipation capability of the wing foil layer would decrease due to the smaller free-state bend angle.

Figure 6:
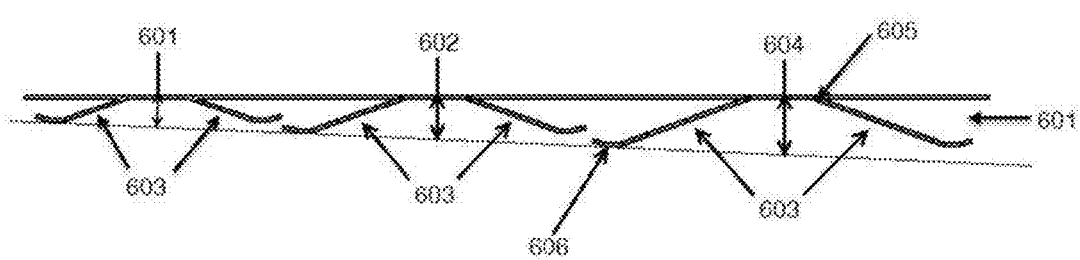
FIG. 6 depicts one embodiment of a portion of a wing foil layer with variable height tabs.

FIG. 6 shows a cross-section through one embodiment of a wing foil layer which has variable height wing foil tabs 603. Each cantilever tab in the illustrated embodiment features a first free-state bend 605 and a second free-state bend 606. For this embodiment, the heights 600, 602 and 604 of the various wing foil tabs changes as a function of location within the two-dimensional array. The overall profile shown in the embodiment is tapered. Other embodiments may also use profiles where one or more wing foil tab surfaces are initially not in contact with the adjacent counter-surface. Other embodiments may have profiled regions of the web and/or frame which are not in contact with the mounting surface.

A plurality of the wing foil layer's surface regions may be cooperatively engaged with the mounting surface and/or counter-surface, for example, being fixedly attached, removably attached, and merely in contact with or resting against. There may be an additional layer between the wing foil bearing surfaces and the mounting and/or counter-surface layer, such as a coating, thin foil shim and/or adhesive layer. In embodiments with multiple layers, the mounting surface and/or counter-surface for one or more wing foil layers may themselves be wing foil layers as described below, such as in a stacked configuration. Applications are also possible where only one of a mounting surface or a counter-surface is be present, such as when the other wing foil layer surface directly interacts with a fluid, a magnetic field, or other nonstructural force. One example of such an application is a wing foil bearing with one surface directly acted upon by hydrodynamic or hydrostatic fluid forces.

Figure 7:
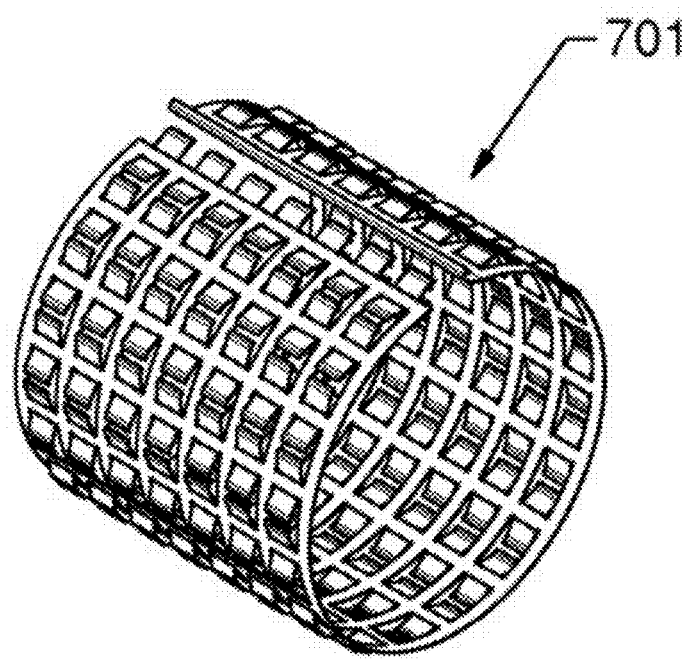
FIG. 7 shows an embodiment of a generally cylindrical wing foil layer.

The wing foil layer shown in FIG. 1 is a generally planar two-dimensional (length and width) and regularly-spaced array of tabs. However, numerous other wing foil layer geometric embodiments are possible. For example, a generally two-dimensional cylindrical array (axial and circumferential) of wing foil tabs as shown in FIG. 7. A cylindrical profile may be especially advantageous for supporting a cylindrical or generally cylindrical mounting surface or counter-surface in combination with a cylindrical or generally cylindrical housing. The wing foil layer embodiment shown in FIG. 7 nearly forms a complete cylinder, i.e., the cross-section of the structure is almost a full 360-degree circle. Cylindrical partial arc wing foil bearings encompassing from 1 degree up to and including 360 degrees may be used depending on application requirements. Generally conical layers may also be used in which the size cross-sectional shape of the array increases along a length of the structure. Conical wing foil bearings may be advantageous in applications where both radial and axial forces need to be supported by a single wing foil bearing. One of numerous advantages of wing foil bearings over prior art is that, given a suitable arrangement and sizing of the tabs, a wing foil bearing may be designed to support surfaces of nearly any geometric form. Examples include, but are not limited to, annular, hemispherical, spherical, toroidal, stepped cylinders and general polyhedrons.

Figure 8:
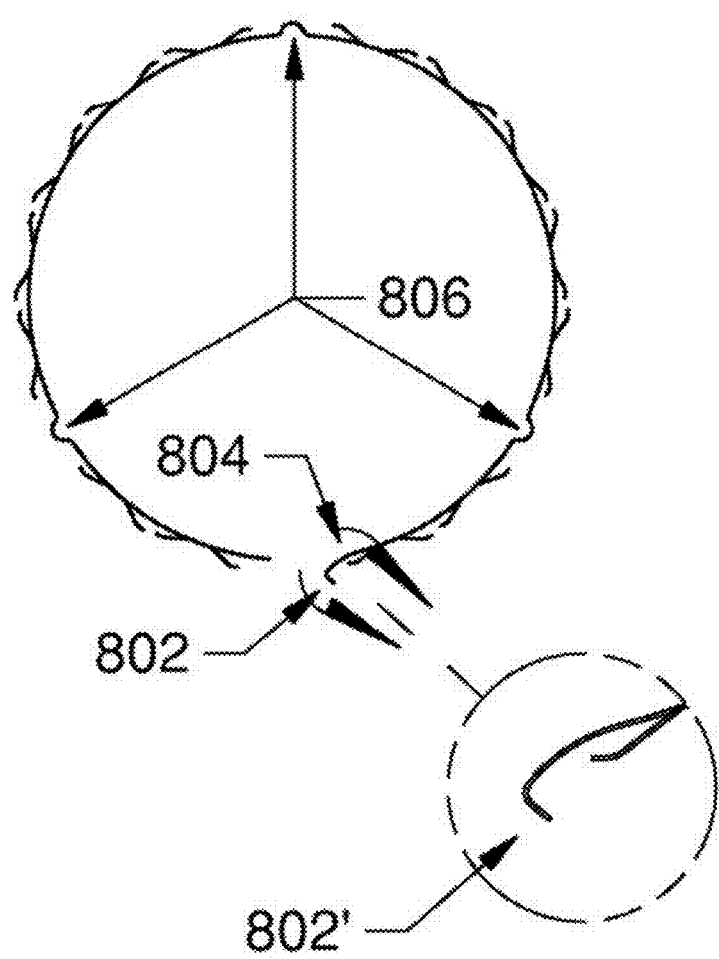
FIG. 8 is a cross-sectional view of one embodiment of a generally cylindrical wing foil layer.

A complete wing foil bearing embodiment may also include various other free-state bends and contoured regions to enhance the overall performance, tailor performance for a particular application, and/or provide for localized properties. For example, the wing foil bearing embodiment shown in FIG. 8 includes a retaining feature 802 at one end that may, for example, be inserted into a corresponding profiled slot cut into a housing to position and mount the wing foil bearing in a housing. Retaining feature 802 in the embodiment shown in FIG. 8 is a hook-shaped ledge that can fit into a groove in a housing. Other embodiments may have a different retaining feature profile than shown to locate the wing foil layer relative to a mounting surface or a counter-surface to form a bearing. Other methods of locating the wing foil layer relative to the housing may be used, including, for example, welding, brazing, riveting, adhesives and other known techniques for attaching components. In other embodiments, the transitions between the wing foil tabs and retaining features may be profiled to better meet application needs. For example, the embodiment shown in FIG. 8 includes an additional free-state bend 804 adjacent to the mounting feature. The additional free-state bend 804 shown in this embodiment allows the retaining feature 802 to slide into the corresponding housing slot without deforming the wing foil bearing profile. The embodiment shown in FIG. 8 also has free-state recessed regions 806 located around the circumference. Embodiments with recessed regions may be especially well suited for multi-pad radial compliant foil bearings, where the recess regions may be aligned with recesses or feed pockets/holes in the smooth top foil to facilitate the implementation of a multi-pad compliant foil bearing. Embodiments may feature one or more of such features. As one of ordinary skill would appreciate, a wide variety of recess geometries might be used depending on the application requirements.

Figure 9:
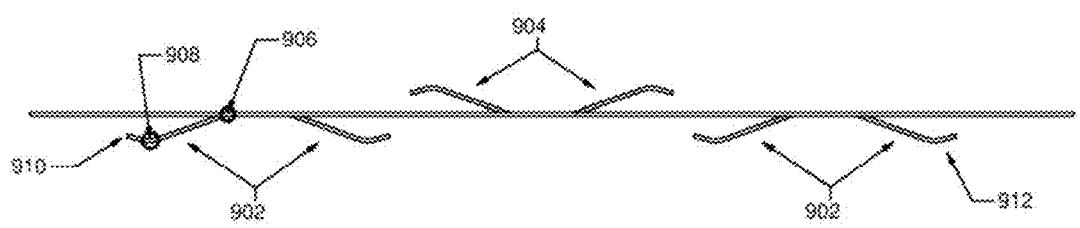
FIG. 9 is a cross section of a one embodiment of a wing foil layer according to the present approach.

FIG. 9 shows an embodiment of a wing foil layer having tabs on both sides of the layer, such that some tabs 902 protrude to one side of the frame and web regions, and other tabs 904 protrude to the opposite side of the layer. In this embodiment, each tab has a first free-state bend 906 at the web region, and well as a second free-state bend 908 in close proximity to the free edge 910 to form a foot 912. As can be seen, the second bend is a reverse bend, in that the concave portion of the second bend 908 is on the opposite side of the tab from the concave portion of the first bend 906. Embodiments including such features may be especially advantageous, for example, to increase the magnitude of the deflection of the wing foil bearing when loaded without increasing the bending stresses in the wing foil cantilever tabs.

Figure 10:
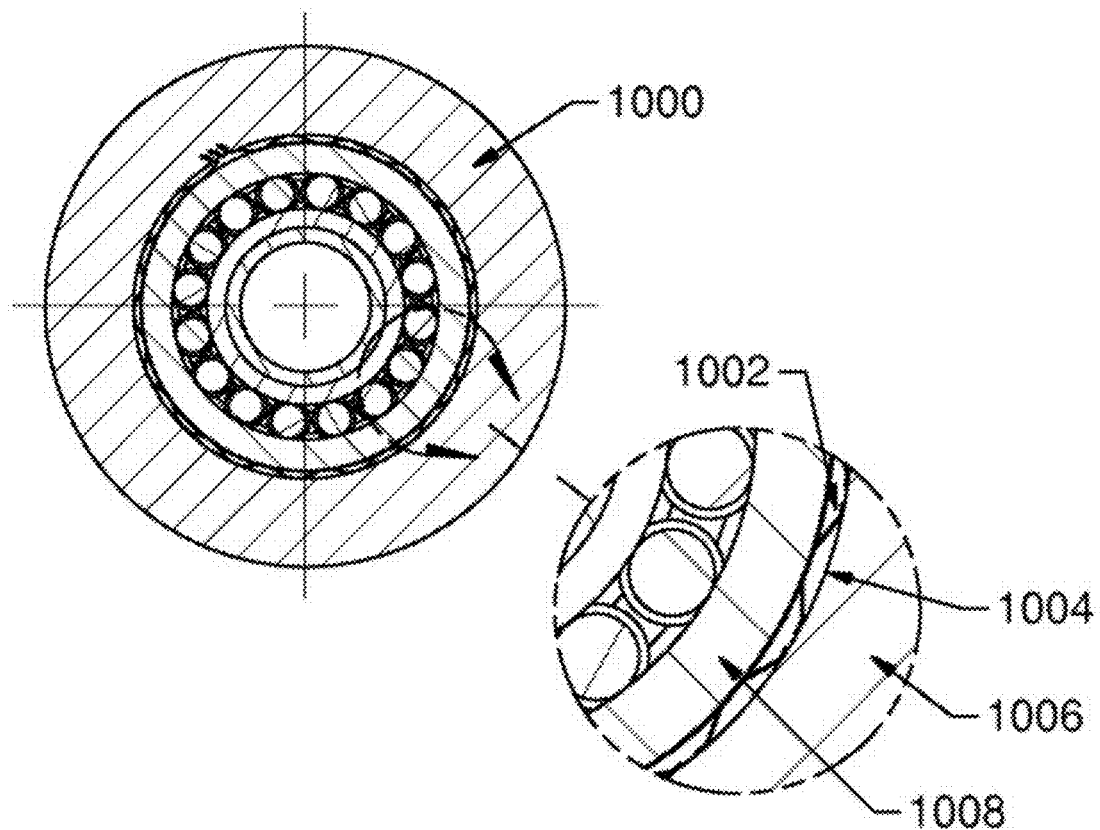
FIG. 10 depicts a cross-sectional view of one embodiment of a generally cylindrical wing foil layer mounted in a housing and supporting a rolling element bearing.

In some applications, the mounting and counter-surfaces cooperatively engaged with a wing foil bearing might be much stiffer or nearly rigid compared to the wing foil layer. One example of this type of application may be in a rotating machine as a compliant support bearing for a rolling element bearing. FIG. 10 shows a cross-section through one embodiment of a rotating machine 1000 having a circular wing foil layer 1002, with the tab surface cooperatively engaged with a counter-surface 1004 in a housing 1006 with a generally circular bore, and the frame/web surface cooperatively engaged with a mounting surface formed by the outer race of a rolling element bearing 1008. In the embodiment shown, the wing foil layer stiffness and vibration energy dissipation provide many of the same benefits as a conventional oil lubricated squeeze film damper, but without the drawbacks of oil lubrication. Since they do not require oil, wing foil layers are especially suitable for use as the compliant support for an auxiliary bearing system for use with an active magnetic bearing system.

Other embodiments may be used with other bearing types such as fixed geometry hydrodynamic bearings, tilting pad hydrodynamic bearings, or other types of bearings that can support a rotating shaft. In some embodiments, the clearance spaces within the wing foil bearing may be filled with oil. Filling the clearance regions with oil would be expected to increase the vibrational energy dissipation capability of the wing foil bearing.

One of many applications of the embodiment shown in FIG. 4 is as a shock or vibration mount for some device or structure which may be either sensitive to vibration, or may otherwise transmit undesirable vibration to the supporting structure. Planar as well as non-planar wing foil layers may be used depending on the application requirements. There are also applications where it may be advantageous to sandwich the structure or a mounting feature between two or more separate wing foil layers acting on different sides of the supported structure. This embodiment may be used, for example, to provide bi-direction action in two opposing directions that might not be possible to achieve with a single wing foil bearing. Multi-layer embodiments may also be used to increase the stiffness and vibrational energy absorption capability. Locating a cylindrical wing foil layer around or within a circular mounting feature may present numerous advantages in certain applications, as discussed elsewhere herein. A cylindrical wing foil bearing might, for example, be used as a high temperature capable support/shock and vibration reducing mount for a pipe.

For many shock or vibration mount applications, the wing foil layer stiffness and vibrational energy absorbing characteristics would be selected such that the transmitted dynamic force between the housing and the item is altered. In many applications, the design goal would be to reduce the transmitted dynamic force by using a low stiffness wing foil bearing design. With a low stiffness, the natural frequency of vibration of the bearing and supported system is below the expected range of frequencies where reduction in transmitted forces is desired. In other applications, the wing foil bearing stiffness may be tuned, for example, to move a resonance away from an excitation frequency. The vibrational energy absorbing capability of the wing foil bearing may be used to ensure that the amplitudes of vibration remain acceptable in the case that the frequency of the vibration coincides with a natural frequency where there is relative motion between the mounting surface and countersurface.

Using the wing foil bearing as an vibrational energy absorbing compliant mount has a number of advantages over prior art. Some examples include:

1. Wing foil bearings provide a means to dissipate vibrational energy. Prior art based on a simple spring mount has limited ability to dissipate vibration energy.
2. Wing foil bearings may be made from materials that are functional at very high and/or very low temperatures. Thus, some embodiments of a wing foil bearing may be used over a very wide temperature range. For example, a wing foil bearing may be manufactured from Inconel X750. This material has good strength and spring properties from cryogenic temperatures to in excess of 1200 degrees Fahrenheit. Other common spring materials such as 17-4 PH or 17-7 PH Stainless Steel provide useful properties at up to about 600 degrees Fahrenheit. This is in contrast to more typical viscoelastic materials which are often used for shock/vibration mounts and have a very limited operating temperature range. For example, the operation range of a rubber vibration mount may be limited to minus 65 F to plus 300 F.
3. Because a wing foil bearing does not require an oil feed system, it may be used in applications that do not have an oil lubrication system, or where the volume or weight of an oil system may be undesirable, or in applications where oil contamination to the environment or material being processed must be avoided. For example, a wing foil bearing may be used as a compliant mount for a sealed, grease lubricated ball bearing.
4. The wing foil bearing's compliance readily accommodates differential thermal growth and manufacturing tolerance variations between mounting surfaces.
5. Wing foil bearings may be made from materials that do not creep to the degree that viscoelastic bearings do.
6. Wing foil bearing embodiments manufactured from metal or a material with a high thermal conductivity may provide a better thermal path to help remove heat from the supported structure than a viscoelastic or rubber bearing.
7. Wing foil bearings can be designed to have nonlinear stiffness characteristics. This capability can be used, for example, to provide different behavior for small vibrations versus large shock events. It may also be used to reduce the variation in system natural frequency when the mass of the supported structure changes (in the case that the wing foil bearing is loaded by the weight of the structure in a generally vertical orientation). This can be accomplished by designing the stiffness to vary in a roughly 1 to 1 proportion with applied load. Since natural frequency is roughly equal to the square root of stiffness divided by mass, the changes in mass are cancelled out by corresponding changes in stiffness. Furthermore, since the frictional vibration energy absorbing capability is also generally proportional to the applied load, there will also be a corresponding increase in this parameter as the supported structure weight increases.
8. Variable wing foil tab heights around the circumference of a circular wing foil bearing can easily be used to offset the static sag due to gravity for a horizontal application. In this case, the cantilever tab heights at the bottom of the wing foil bearing may be taller than the corresponding tabs located at the top. This height difference may be used to offset mounting surfaces vertically by an amount approximately equal to the static sag due to the gravity (or operating loads). This sag compensating ability may be used, for example, in a rolling element bearing support application, to center the shaft supported by combined rolling element bearing plus wing foil bearing system in a housing.

Figure 11:
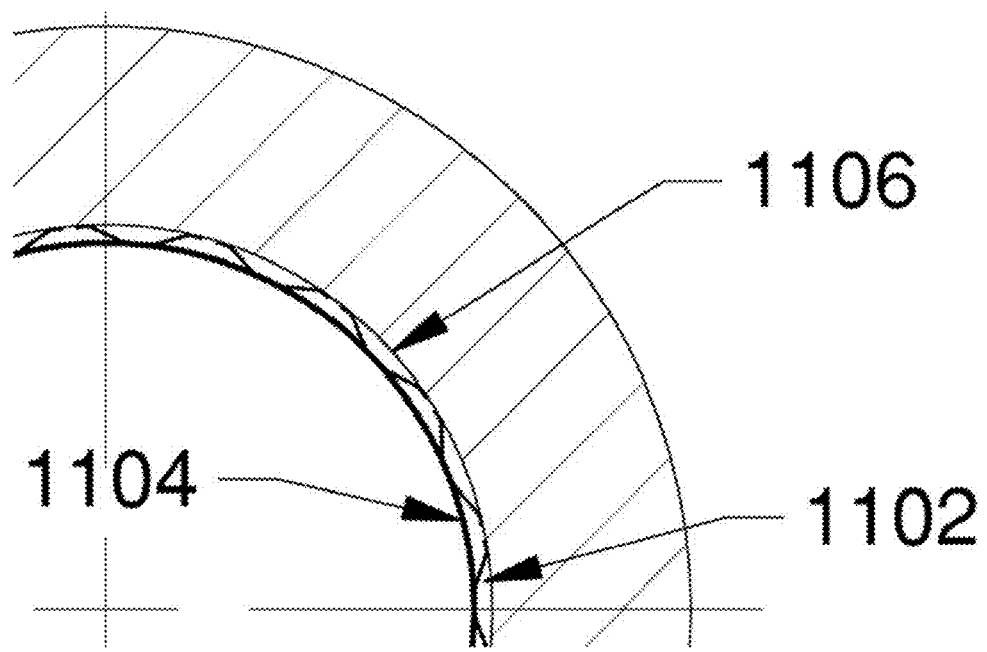
FIG. 11 depicts a cross-sectional view of one embodiment of a generally cylindrical wing foil layer mounted in a housing and supporting the top foil of a radial compliant foil bearing.

Wing foil bearings may also be used to support deformable surfaces. For example, they are ideally suited for use as the compliant element of a compliant foil bearing. FIG. 11 shows a partial cross-section of an embodiment of a generally cylindrical wing foil layer 1102 positioned between a generally cylindrical smooth top foil 1104 (mounting surface) and a generally cylindrical housing 1106 (countersurface). This embodiment may be used, for example, to create a radial compliant foil bearing. An alternative embodiment is an "inside-out" radial compliant foil bearing, comprised of a generally circular wing foil layer located inside of a top foil, that may be located inside a hollow rotating shaft. As would be apparent to one of ordinary skill in the art in view of this disclosure, the surface of the smooth top foil adjacent to the rotating shaft may have a variety of coatings to control friction and wear during startup and shut down.

Figure 12:
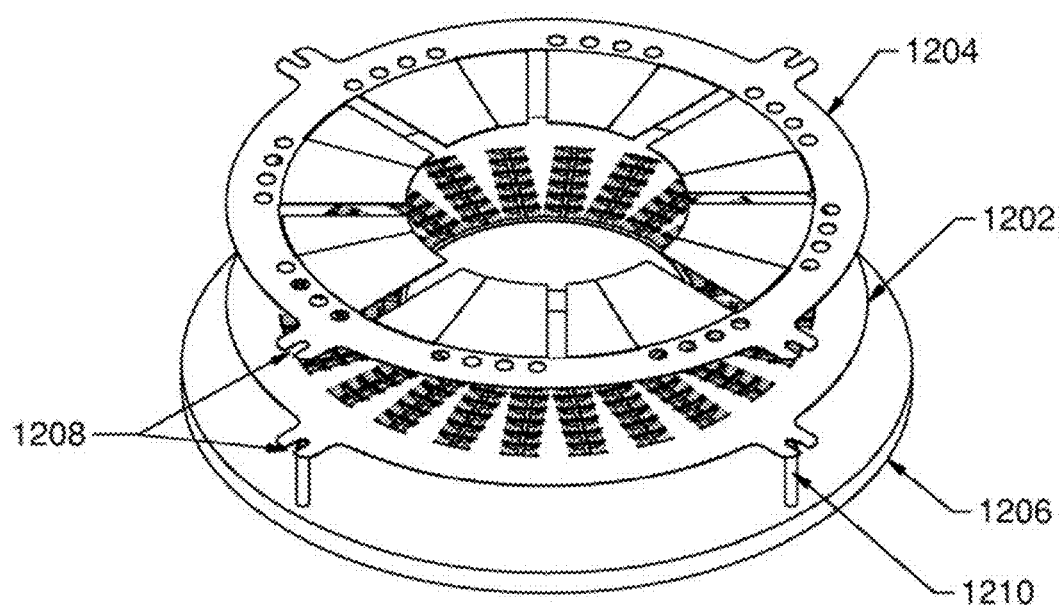
FIG. 12 depicts a cross-sectional view of one embodiment of an array of a generally planar wing foil layer mounted to a plate and supporting the top foils of a thrust compliant foil bearing.

FIG. 12 shows an embodiment of a generally planar wing foil layer 1202 positioned between the bottom of a profiled smooth top foil 1204 (mounting surface) and the top of a plate 1206 (counter-surface) to create a single acting thrust compliant foil bearing. In the embodiment shown in FIG. 11, locking tabs 1208 engage corresponding locating pins 1210 are used to locate the components when the compliant foil bearing is assembled. Other methods of locating the bearing relative to the housing may be used, including, for example, welding, brazing, riveting, adhesives, and other known techniques for attaching components. The number of locating features or the number of attachment points may vary in different embodiments. In other embodiments, the transitions between the wing foil tabs and locating features might be profiled in some way to better meet application needs. As would be apparent to one of ordinary skill in the art, the surface of the smooth top foil adjacent to the rotating shaft may have a variety of coatings to control friction and wear during startup and shut down.

In the hydrodynamic compliant foil bearing application, the wing foil layer may be a support structure that provides resilient, vibrational energy dissipating support to the smooth top foil. As with any hydrodynamic bearing assembly, once the shaft being supported is rotating at a high enough speed, a hydrodynamic pressure wedge is formed between the rotating shaft and the smooth top foil in fluid filled regions where the gap between them decreases in the direction of rotation. These hydrodynamic pressure forces support and position the shaft. Interactions between the hydrodynamic pressure, the smooth top foil deflections and the wing foil bearing deformations control the shape of the gap between the smooth top foil and the rotating shaft. Additionally, vibrational energy dissipation within the wing foil bearing may improve the rotor-bearing dynamic characteristics. For example, this energy dissipation limits shaft vibration amplitudes during passage through critical speeds. It also helps to control the compliant foil bearing's propensity for inducing unstable vibrational motion of the shaft at higher operating speeds.

When a wing foil layer is used as the support element for a compliant foil bearing, the ability to independently control both stiffness and overall height for each wing foil tab within the two-dimensional array can be used in a number of ways to enhance the performance of the overall bearing assembly. For example, they can be used to provide preload. As is known to one of ordinary skill in the art, a hydrodynamic radial bearing clearance geometry which has one or more converging profiles which are not concentric with the shaft when the shaft is centered in the bearing clearance, and that converge in the direction of shaft rotation, can considerably reduce a bearing's propensity for unstable whirl. A hydrodynamic bearing with this geometry is often referred to as "preloaded." In the case of a radial compliant foil bearing which contains a wing foil layer as described herein, geometric preload can readily be achieved by using wing foil tabs which increase in height in the direction of rotation over portions of the bearing, thus decreasing the corresponding gap between the top foil and the shaft. Preload during operation can also be achieved by varying the stiffness distribution of the cantilever tabs in the two-dimensional array of tabs, such that it increases in the direction of rotation over some portion of the bearing. In this case, the hydrodynamic pressure wedge which is formed due to relative motion across the gap between the top foil and moving surface supported by the hydrodynamic pressure, will deflect the wing foil bearing unevenly. There will be more deflection in the softer regions, and less in the stiffer regions for a given hydrodynamic pressure. This characteristic may be used to form a wedge shaped profile.

Figure 13:
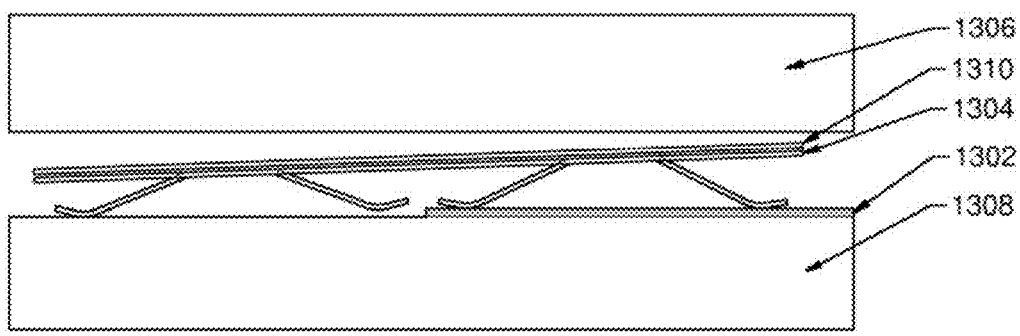
FIG. 13 is a cross section of a one embodiment of a wing foil layer with a shim.

As shown in FIG. 13, embodiments with thin shims 1302 located at selected regions between a surface of wing foil layer 1304 and a counter-surface on body 1308 may also be used to add preloaded regions to a bearing by decreasing the gap between the moving surface on body 1306 and the compliant top foil 1310. In other embodiments, shims may be located between the mounting surface and the wing foil bearing web/frame surface. Embodiments with shims in both locations are possible.

Variable height and/or stiffness wing foil bearing cantilever tabs as well as shims may be used in other embodiments of wing foil bearings that are integrated into a thrust compliant foil bearing to provide a geometry which converges in the direction of shaft rotation to facilitate the formation of hydrodynamic pressure to support axial loads for a rotating shaft.

Other embodiments of two-dimensional arrays of cantilever tabs with variable heights and/or bending stiffness, and/or shims may be used in wing foil bearings that are integrated into linear slider compliant foil bearing to provide a geometry which converges in the direction of sliding to facilitate the formation of hydrodynamic pressure to support the sliding component.

One of many advantages of the wing foil bearing over prior art in the compliant foil bearing application is the ability to provide a plurality of separate wing foil tabs distributed under the top foil. The array of separate wing foil tabs increase the compliant foil bearing's ability to accommodate relative misalignment between the rotating or sliding surface and the top foil surface(s), since each wing foil tab can deflect individually. Much of the prior art uses corrugated strips of bump foils, which often couple forces and deflections in one region of the bearing to deflections in other regions of the bearing.

The ability to individually vary each tab in the two-dimensional array of a wing foil layer, or in multiple two-dimensional arrays on a wing foil layer, allows the bearing designer to alter the structural stiffness in accordance the expected distribution of hydrodynamic pressure during operation. This stiffness variation enhances the ability of a top foil to deflect as required for optimal performance, despite non uniformities in the hydrodynamic pressure profile.

In many embodiments of hydrodynamic or hydrostatic bearings, the bearing surface is divided into separate, distinct regions, often referred to as "pads". For example, the thrust compliant foil bearing shown in FIG. 12 has eight pads. Embodiments of wing foil bearings may be used in compliant foil bearings with varying numbers of pads in a variety of ways. In some embodiments, the pads may be an array of separate and distinct top foils and wing foil bearings in equal numbers. In other embodiments, there may be a different number of top foils than wing foil layers (in radial or thrust bearings, for example, one 350 degree top foil combined with three equally spaced 110 degree wing foil bearings). In other embodiments, the pads may be defined by recesses, feed holes, etc. in a single top foil, and/or variations in the height of the wing foil layer which generate a plurality of converging clearance regions in the gap between the top foil and the adjacent rotating or sliding component's surface.

Radial bearing embodiments where the wing foil layer and top foil are integrated into a single continuous sheet of material, which may then be wrapped into a spiral shape prior to be installed in a housing, are possible. These integrated embodiments may be especially advantageous, for example, in reducing fabrication cost by reducing the number of separate components.

One of ordinary skill in the art would appreciate that other bearing geometries, including, for example and without limitation, linear slider, conical, and spherical, are possible. Bearing embodiments that support the applied load though primarily any of hydrodynamic lubrication, hydrostatic lubrication, and combinations thereof are possible. The operating fluid might be gas, liquid, or any other suitable fluid state for hydrodynamic lubrication, hydrostatic lubrication, or hybrid combinations. Embodiments that support the applied load though direct sliding contact between the surfaces are also possible.

Embodiments could have various combinations of a single top foil, multiple top foils, a single wing foil bearings and/or multiple wing foil bearings. Other embodiments may include additional "stiffener" foils between the wing foil bearing web/frame surface and the top foil Stiffener foils may be used, for example, to add additional support to the top foil so as to reduce top foil deflections between the wing foil layer tabs. Embodiments with the deformable surface cooperatively engaged with either or both of the wing foil bearing tab surfaces and/or frame/web surfaces are possible.

In compliant foil bearing applications, the wing foil layer provides a vibrational energy absorbing compliant element that has a number of advantages over prior art, including:
1. The designer can readily change tab heights and height distribution within the two-dimensional array of cantilever tabs as required to optimize the initial bearing geometry with features such as preload and inlet taper.
2. The designer can readily change tab stiffnesses and stiffness distribution within the two-dimensional array of cantilever tabs as required to optimize the operating bearing geometry with features such as preload and inlet taper that are generated in response to hydrodynamic and/or hydrostatic pressures. These features are thought to be advantageous, for example, for Generation II and III radial compliant foil bearings.
3. Wing foil layers can accommodate relative misalignment between a bearing and rotating shaft surface and local deformations on any of the surfaces, since each wing foil cantilever tab within the two-dimensional array can move more or less independently. These features are thought to be advantageous, for example, for Generation II and III radial compliant foil bearings.
4. It is possible produce bearings with single pads as well as multiple pads to meet application requirements.
5. Some embodiments of wing foil layers are capable of providing enhanced performance using multilayer and non-linear tab profiles as described below. These features are thought to be advantageous, for example, for Generation II and III radial compliant foil bearings.
6. Wing foil layers can be produced from a wide range of materials, including materials which cannot be welded. Many prior art embodiments of high performance compliant foil bearings require a material which can be welded.
7. Wing foil layers are expected to have a lower cost of production than prior art and to be more suitable for high volume, automated production.

One of ordinary skill in the art would understand that other uses are possible. For instance, a wing foil layer may be used in any application where a compliant support structure which also provides vibrational energy dissipation may be beneficial.

Figure 14:
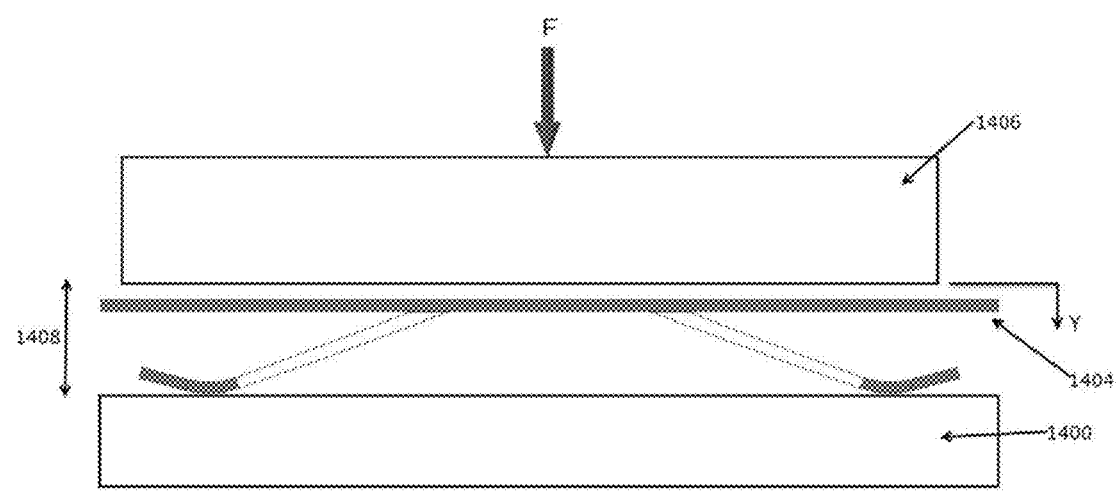
FIG. 14 depicts cross-sectional views of one embodiment of a pair of wing foil tabs prior to load being applied.
Figure 15:
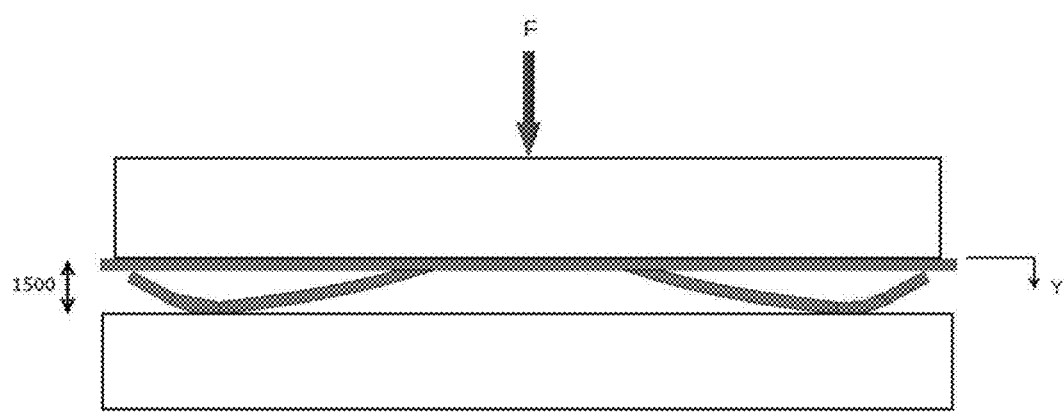
FIG. 15 depicts cross-sectional views of one embodiment of a pair of wing foil tabs after load is applied.
Figure 16:
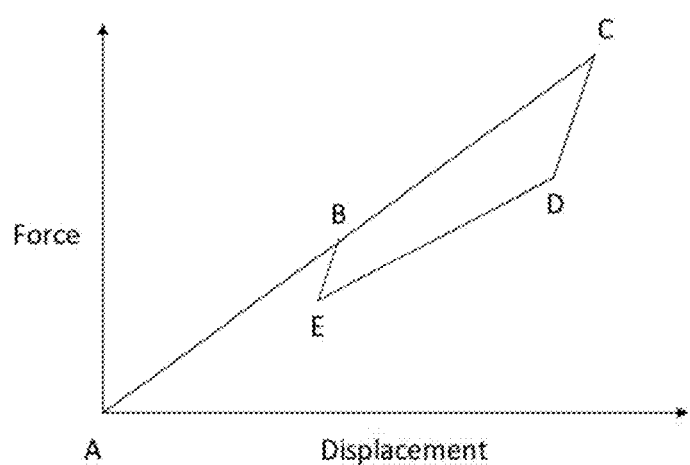
FIG. 16 depicts the conceptual load-deflection curve of one embodiment of a pair of wing foil tabs.

The general operation of a wing foil layer during a loading cycle can be understood by referring to FIGS. 14, 15, and 16. FIG. 14 depicts one embodiment of two cantilever tabs from a wing foil bearing array 1404 located between a body 1406 with a movable mounting surface and a fixed body 1400 with a parallel, but nonmoving counter-surface. The displacement of body 1406 due to the applied load F is in the Y direction. The initial gap between the mounting surface and the counter-surface is 1408. FIG. 16 is a plot of the theoretical force displacement relationship corresponding to this embodiment. Point A on the load deflection curve of FIG. 16 represents the point at which the applied force and displacement are both zero. Point B represents an intermediate load, and point C represents a maximum applied load. As the applied force increases starting from point A, the height of the wing foil bearing begins to decrease. The applied force is balanced by a reaction force resulting from the combined bending force component in the wing foil bearing tabs, frame and connecting web deflections, plus a sliding friction force component due to the free ends of the tabs moving apart and sliding on the counter-surface. Point C in the plot represents the maximum applied force. FIG. 15 shows a conceptual deformed configuration of the wing foil embodiment shown in FIG. 14, but now at the point of maximum load. The gap 1500 between the mounting surface and the counter-surface has decreased.

As the load is decreased from its maximum at point C, the gap starts to return to the original value. Initially, frictional forces keep the free ends of the tabs from moving. The change in reaction force is primarily due to unloading of elastic deformations of the wing foil bearing. At point D, the tab ends begin to slide back towards one another. The applied force is balanced by a reaction force due to the combined bending force component in the wing foil bearing tabs, frame and connecting web, minus a sliding friction force component due to the free ends of the tabs moving towards each other and sliding on the counter-surface. Finally, at point E, another load cycle begins. Initially the ends of the tabs remain fixed due to friction forces, with the change in reaction force primarily due to changes in the elastic deflections within the wing foil bearing. Finally at point B, the free ends of the tabs begin to move. Subsequent cycles over the same range of motion will follow the path E-B-C-D-E on the curve.

The curve shown in FIG. 16 illustrates two of the essential operational features of a wing foil layer. The first is a spring-like behavior of increasing displacement for increasing applied load. The second is a hysteresis effect which results in the unloading curve not being the same as the loading curve. This hysteresis is due to the dissipation of energy via friction. A key point to note is that the magnitude of the friction force is a function of the displacement (or, equivalently, the applied load), rather than being constant as is the case for a constant friction force. That is, at point E, the contact load is smaller than at point C, resulting in a smaller friction force at point E than at point C. Load dependent friction is superior to constant friction for absorbing the energy of a vibrating mechanical system via friction [Swanson 2006]. An inherent advantage of the wing foil layer is that it provides the required type of load-displacement-friction coupling.

Figure 17:
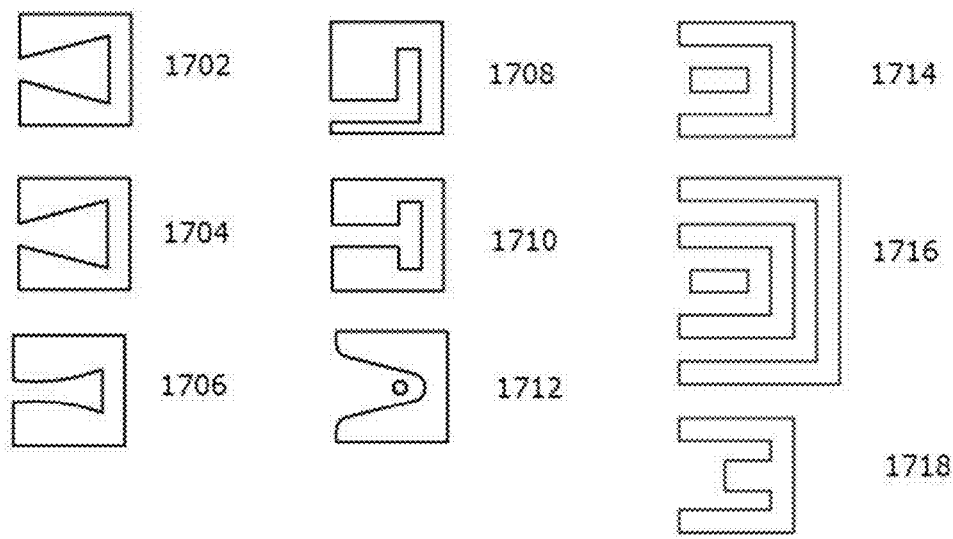
FIG. 17 shows various embodiments of wing foil tab shapes.

Variations in the shape and arrangement of each of the cantilever tabs gives the designer tremendous flexibility to tune the load deflection characteristics of the wing foil cantilever tabs, including spatial variations of the wing foil bearing stiffness within the two-dimensional array of cantilever tabs. For example, in addition to the generally rectangular tabs shown previously, embodiments with non-rectangular tabs which alter the load deflection characteristics of a tab relative to the simple rectangular shape may be desirable for some applications. FIG. 17 shows multiple embodiments of tab shapes. The tab shapes include, but are not limited to, tapered 1702, reverse tapered 1704, hourglass 1706, "L" 1708, "T" 1710, tapered with circular hole 1712, rectangular with single cutout 1714, multiple frame and cutout 1716, and segmented end 1718. Tab shapes 1714, 1716, and 1718 feature a spaced apart region between integral edges. The spaced apart region may be useful for reducing weight and providing various profiles, and may also include one or more additional tab shapes. As would be appreciated by one of ordinary skill, the alternative tab profiles depicted would have a lower bending stiffness than a full rectangular tab, but the particular geometry allows for controlling stiffness and other properties. Some embodiments may advantageously feature more than one tab shape in a two-dimensional array, or multiple arrays having different tab shapes. For example, using a plurality of tab shapes may be advantageous to tune the spatial distribution of the wing foil bearing's stiffness within the two-dimensional array of wing foil cantilever tabs. Some embodiments using the "L" shaped profile of item 1708 may be designed to combine both bending and twisting deformations of the tab. This approach may be especially advantageous for optimizing the performance of multilayer configurations by changing how the surfaces of the layers slide relative to one another. The designer may choose a specific profile based on various considerations, including, but not limited to, bearing fabrication issues, stresses and stress concentrations induced by loading, frictional behavior during loading, wear life and/or shape of the counter-surface. The designer may also vary the location and number of free-state bends. For example, the profile of the tab shape 1716 defines two separate tabs with a common web region. This tab may be used, for example, in an embodiment with different free-state bend angles on each of these tabs. Tab shapes having a segmented end 1718 provide for multiple points of contact against the counter-surface, and may have different effective heights for each end for the same tab to provide for a step increase in stiffness at a specific load, for example.

Figure 18:
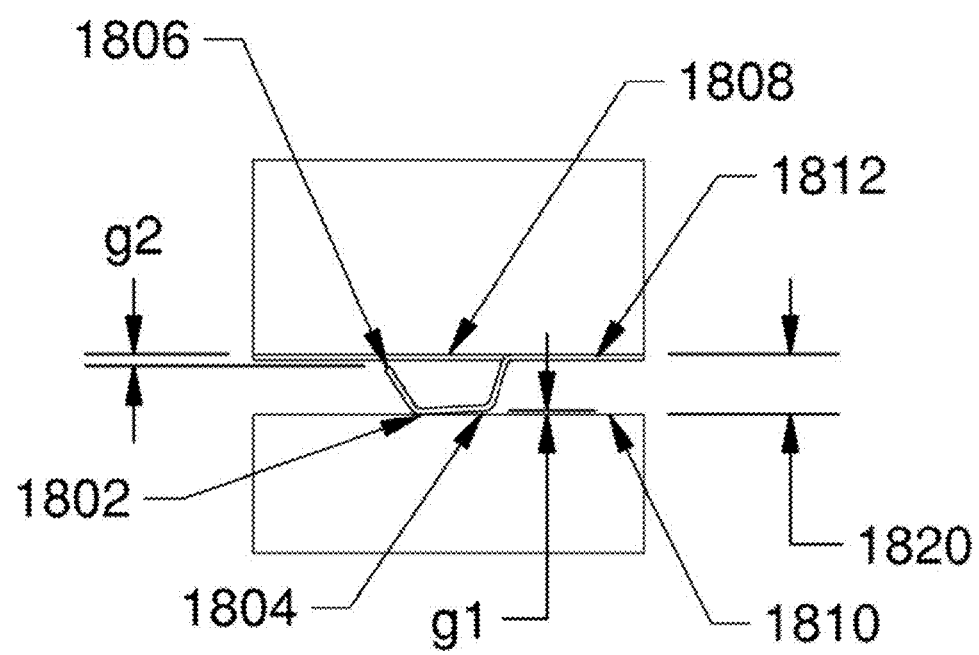
FIG. 18 shows one embodiment of a wing foil tab with nonlinear load deflection characteristics

In addition to varying the outer profile or adding cut out regions, multiple free-state bends may be used to vary the overall shape of the tab. One use of these additional bends may be to create the foot shown in FIG. 3. In other embodiments multiple bends can also be used, for example, to create nonlinear force-displacement characteristics. Nonlinear characteristics offer considerable performance advantages by having different force-displacement characteristics for low and high load conditions. For example, these non-linearities have been proposed for enhanced Generation III radial compliant foil bearing configurations. One embodiment which has a nonlinear force displacement characteristic is shown in FIG. 18. In this embodiment, wing foil layer 1812 is cooperatively engaged with mounting surface 1808 and counter-surface 1810. The free-state bend 1802 is initially in contact with surface 1810, and a small gap g1 exists between the surface and the tab at free-state bend 1804. As the gap 1820 decreases due to an applied force, gap g1 also decreases. For high enough force, the point of contact between the wing foil tab and the counter-surface shifts from one location 1802 to another location 1804. This shift in the point of contact reduces the effective cantilever bending length of the tab, thus increasing the tab's cantilever bending stiffness. Another feature which also provides nonlinear stiffening is the small gap g2 at the free edge 1806 at the distal end of the tab. As the gap 1820 decreases due to applied force, the gap g2 also decreases. Eventually, the distal end of the tab 1806 will contact mounting surface 1808, thus increasing the stiffness of the wing foil cantilever tab. One of ordinary skill in the art would understand that numerous other free-state tab profiles which produce a change in the effective length of the wing foil tab as the applied force increases are also possible. Nonlinear stiffness embodiments that involve only one surface or both surfaces, separately or in combination are possible. Embodiments that combine a variable profile shape with multiple bends and or cutouts are possible.

Figure 19A:
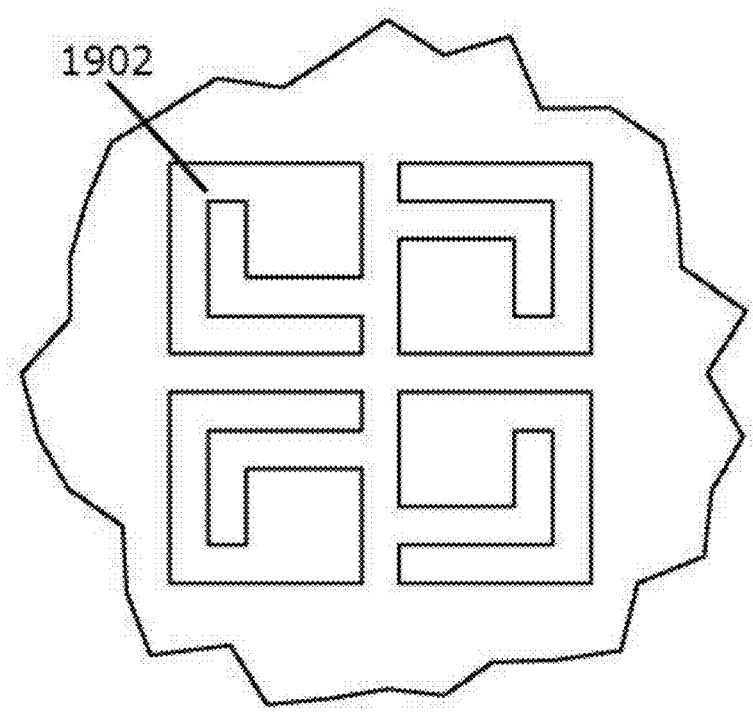
FIGS. 19A-19C show various embodiments of wing foil tab arrangements according to the present approach.
Figure 19B:
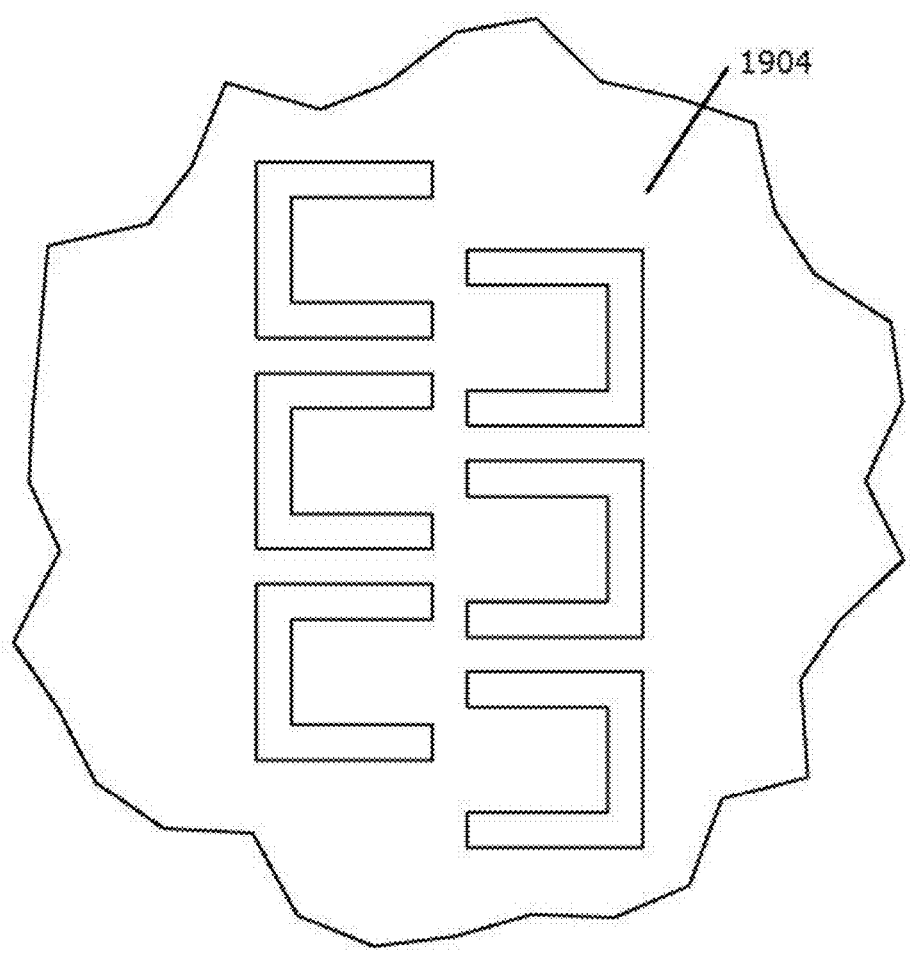
Figure 19C:
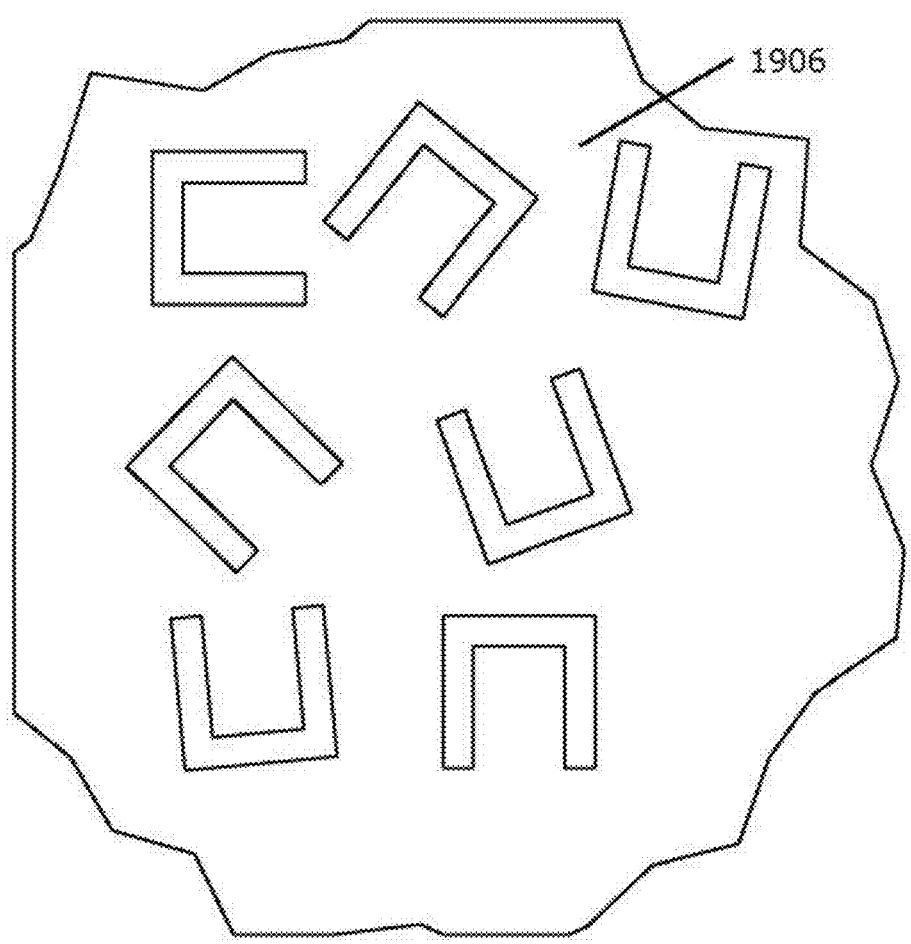

The wing foil bearing two-dimensional array of cantilever tabs shown FIG. 1 has symmetric, regularly spaced, aligned cantilever tab pairs, with each pair being composed of two substantially mirror images about an axis defined by the center of the web region. Many other embodiments are possible, as shown in FIGS. 19A-19C. FIG. 19A shows a two-dimensional array 1902 of pairs of tabs that are substantially rotated about an axis perpendicular to the web center. FIG. 19B shows one of many possible two-dimensional arrays 1904 with staggered or offset patterns. FIG. 19C shows an embodiment of a two-dimensional array 1906 with an irregular pattern or irregularly-spaced array that may has no apparent axes of symmetry or rotation to the tab profiles and windows. Embodiments with wing foil tabs within a two-dimensional array having a different shape, bend profile and thickness of the thin material may even be used to optimize the overall wing foil bearing's performance for a specific application. For example, the staggered embodiment shown in FIG. 19B may, in some cases, provide more uniform support to a compliant foil bearing top foil than a symmetric arrangement. The irregular embodiment of FIG. 19C may be advantageous for some thrust compliant foil bearings, where a desirable distribution of wing foil bearing support stiffness may not be achievable with a regular array. The flexibility in placement, shapes and arrangement of the wing foil tabs is one of the significant advantages of the wing foil tab approach over prior art.

Figure 20:
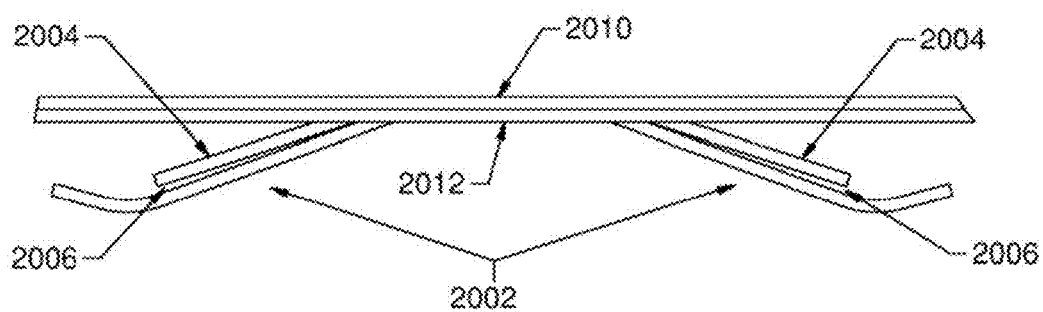
FIG. 20 depicts a cross-sectional view of one embodiment of a nested wing foil layer.
Figure 21:
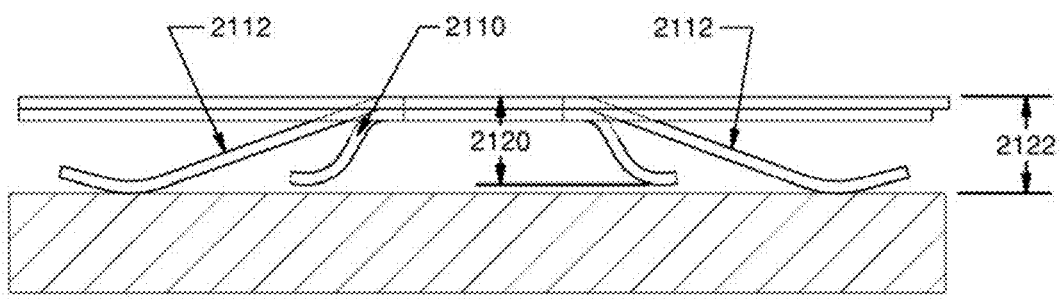
FIG. 21 depicts a cross-sectional view of one embodiment of a nested wing foil layer.

Wing foil layers may also be nested to provide additional properties and benefits. FIG. 20 shows a cross-section through one embodiment of a multilayer nested wing foil layer. As shown in this embodiment, a nested wing foil bearing may be formed by displacing at least one set of the tabs 2004 of one wing foil layer 2010 through the window region (not visible in the drawing) of another wing foil layer 2012. As shown, the multilayer nested embodiment may be constructed such that there is a small gap 2006 between the adjacent tabs 2002 and 2004 of the nested tab arrays after forming and assembly. Other embodiments may be constructed so that the gap between the layers is minimized. Another nested embodiment is shown in FIG. 21. In this embodiment, a pair of wing foils tabs 2110 with height 2120 is nested within another pair of wing foil tabs 2012 with height 2122. 2120 might be greater than, less than or equal to 2122. A similar effect may be obtained for an embodiment of the single layer cutout profile shown as 1714 in FIG. 16 by having different bend angles for the outer and inner integral regions of the tab. Embodiments with more than two wing foil bearing layers may have advantages in some applications. For example, embodiments with additional layers may be used to increase the stiffness relative to a single layer. Embodiments with additional layers may increase the number of potential friction interfaces, which may be useful for increasing the nested wing foil bearing's capability for dissipating vibration energy. Embodiments with additional layers may be used to achieve nonlinear stiffness characteristics by, for example, having an initial gap between tab layers. For low loads, only one tab array layer is active. For higher loads, the gap closes and multiple tab array layers act cooperatively, thus increasing the wing foil layer's stiffness.

Nested configurations may be implemented over the entire wing foil layer, or alternatively over smaller regions of a larger layer at selected locations depending on application requirements. For example, a nested embodiment may be used in regions of the wing foil layer where the designer want a higher stiffness when designing a compliant foil bearing. For some embodiments, the nested layers can be formed in a single step with the two wing foil blanks already stacked. For other embodiments, the tab profiles can be formed separately, then the nested bearing assembled.

Other multilayer bearing embodiments may combine one or more wing foil tab layers with one or more layers of thin material that does not have tabs. One embodiment may feature a thin sheet or coating of a viscoelastic material inserted between the top foil and wing foil layer or between the tab surface and the mounting surface to enhance the overall vibrational energy dissipation capability. In another embodiment, a coating or thin sheet of viscoelastic material may be inserted between two of the layers of a nested configuration to enhance the overall vibrational energy dissipation capability. Another embodiment may include a thin sheet of metal foil material inserted between the top foil and wing foil bearing in the compliant foil bearing application to act as a "stiffener" to reduce the top foil sag between wing foil bearing top webs induced when the top foil is loaded by fluid pressure during operation of the bearing assembly. In some embodiments, there may be various cutouts and slots within the stiffener to change its bending stiffness distribution. In some embodiments, it may be advantageous to use one or more additional non-tab layers over the entire wing foil bearing, in other embodiments, the additional layer might only be used in smaller sub-regions. For example, a three layer nested embodiment with a viscoelastic coating only between the adjacent tabs of two of the nested layers. Another embodiment of a multilayer bearing may be a coating on some or all of the wing foil tabs. One such embodiment would be to coat a stainless steel tab surface with copper via a process such as electroplating or sputtering. A copper coating would tend to increase the coefficient of sliding friction between the coated tab(s) and a steel counter-surface. A higher coefficient of sliding friction may be advantageous for increasing the sliding frictional forces which dissipate vibrational energy for a wing foil bearing.

Figure 22:
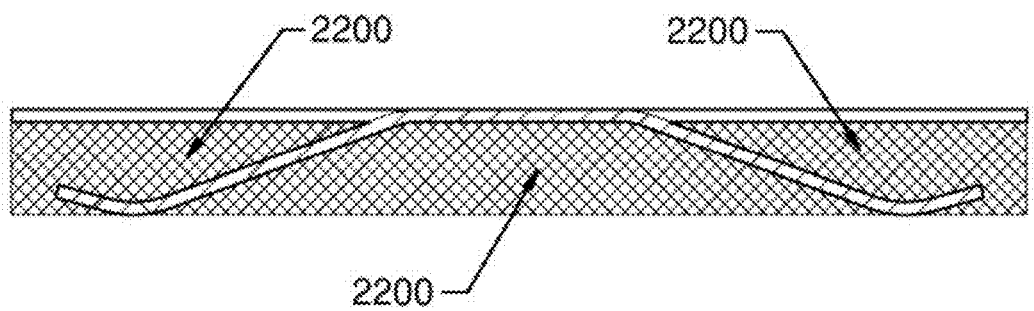
FIG. 22 depicts a cross-sectional view of one embodiment of a filled wing foil layer.

FIG. 22 shows an embodiment which generalizes the use of a single material or multiple layers of different materials, to fill all or a portion of the void 2200 defined be the space between one or more of the wing foil bearing surfaces and/or one or more of the mounting and/or counter surfaces, with a liquid such as oil, a gel, or a solid viscoelastic material. The relative motion between the mounting and counter-surfaces, and the motion of the wing foil bearing will generate various combinations of squeezing, stretching and shearing forces within the fill material(s) in the void. In some filled embodiments, these forces may be used to provide additional stiffness and/or vibrational energy dissipation.

One embodiment of an oil-filled wing foil bearing is as an enhanced squeeze-film damper. In this embodiment, the wing foil bearing may be installed in an annular, oil filled cavity between a rolling element bearing and a housing. In some embodiments, end-seals may be provided to prevent the oil from leaking out. Oil filled wing foil bearing embodiments may combine the high damping of an oil squeeze film damper, with a wing foil bearing acting as a centering spring for the rolling element bearing, in a compact arrangement. A centered squeeze film damper such as this embodiment provides superior performance relative to an uncentered arrangement where there is no centering spring.

One embodiment of a viscoelastic filled wing foil bearing may be produced by fully forming a wing foil bearing, then placing it in a close fitting, generally annular mold which is then filled with a liquid or gel resin, then heated to cure the resin. Another embodiment is to place suitably sized strips of a viscoelastic material, for example, silicone or urethane, with a thickness roughly equal to the height of the wing foil tabs, under one or more of the wing foil bearing webs, and bonded in place with an adhesive. In these embodiments, the viscoelastic material provides additional stiffness and vibration energy dissipation that may be advantageous in some applications. For example, adding a viscoelastic component to a bump foil type radial compliant foil bearing may reduce the amplitude of sub-synchronous vibrations at high operating speeds for some applications. One of ordinary skill in the art would appreciate that other materials or combinations of materials may be used to fill clearance spaces.

Figure 23:
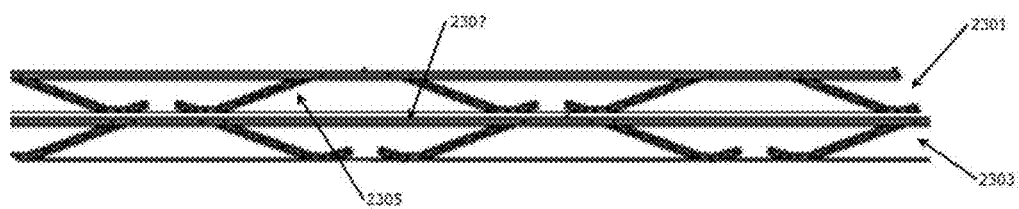
FIG. 23 depicts a cross-sectional view of one embodiment of stacked wing foil layers according to the present approach.
Figure 24:
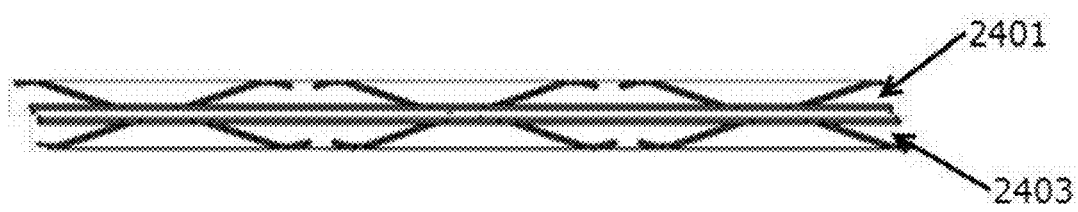
FIG. 24 depicts a cross-sectional view of one embodiment of stacked wing foil layers according to the present approach.

Wing foil layers may also be stacked such that one side of a wing foil layer acts as a mounting and/or counter-surface to a second wing foil layer. Embodiments featuring stacked wing foil layers may have advantages in various applications. FIGS. 23 and 24 show examples of stacked wing foil layers. In FIG. 23, the wing foil layers are arranged with the upper wing foil layer 2301 tab surfaces 2305 cooperatively engaged with the lower wing foil layer's web/frame surface 2307. In FIG. 24, the two wing foil layers 2401 and 2403 shown in this embodiment are arranged with the web/frame surfaces cooperatively engaged. In stacked embodiments, the layers may be arranged with cooperative engagement between any combination of web/frame surfaces and tab surfaces. The design of the wing foil tabs in each layer may be the same or different for each layer. Stacked layers may also have a portion of tabs nested in another layer. A stacked embodiment, for example, may be advantageous to increase the deflection capability for a given applied load without increasing the bending stresses in the wing foil tabs. In other stacked embodiments with wing foil layers that have non-linear stiffness features, the combined nonlinear stiffness characteristics may be used to generate overall nonlinear characteristics which may be difficult to achieve with a single wing foil layer in certain applications.

Another embodiment is a multilayer spirally wrapped wing foil bearing which is integrally produced and overlapped to yield more than one layer.

One of ordinary skill in the art would appreciate that the stacking feature may be used in connection with one or more of the other features described herein. Those of ordinary skill in the art would appreciate that other multilayer, nested, and stacked embodiments may be prepared according to the principles described herein.

Figure 25:
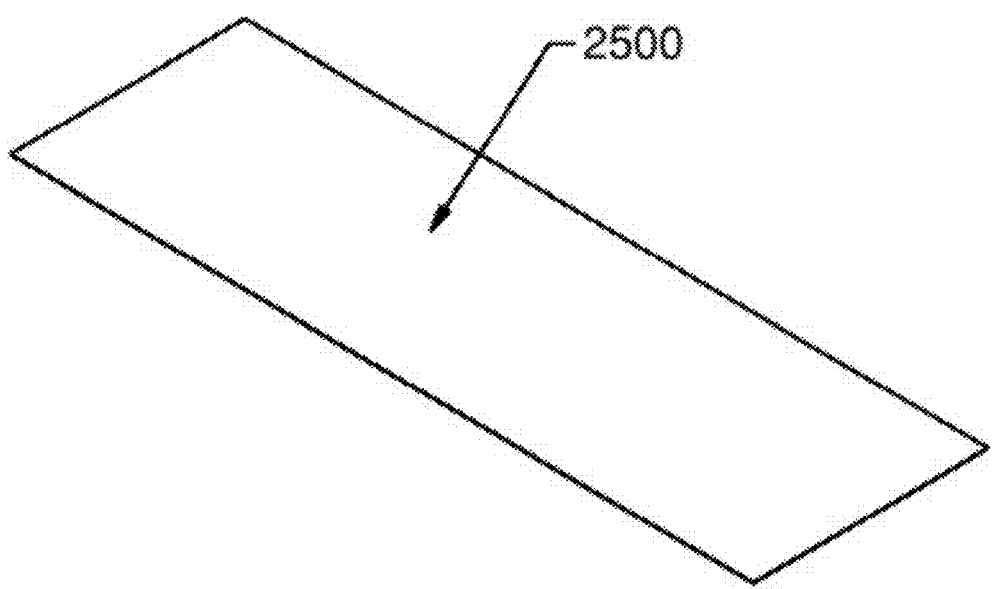
FIG. 25 shows one embodiment of a wing foil blank prior to the tab shapes being formed.
Figure 26:
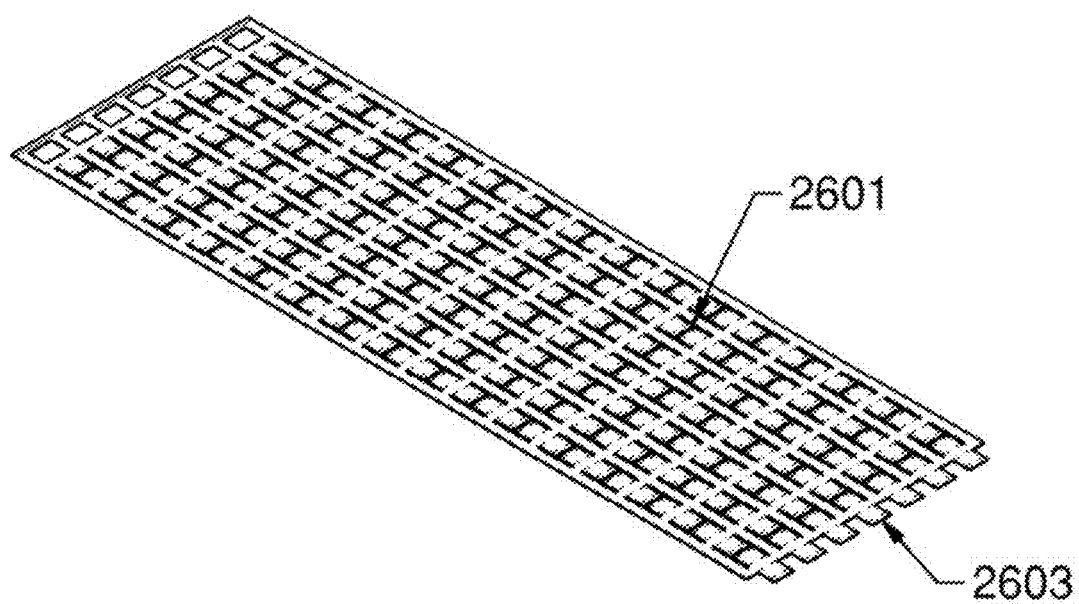
FIG. 26 depicts one embodiment of a wing foil blank after separating tabs shapes from the surrounding blank according to the present approach.

FIGS. 25 through 28 show one of many possible processes for manufacturing a cylindrical wing foil layer. FIG. 25 illustrates the initial blank 2500 of thin foil material. FIG. 26 shows the blank after it has been processed to form the two-dimensional array of cutouts 2601 which define the tabs 2603. This step can be performed using a variety of processes, including, for example and without limitation, chemical etching, electrical discharge machining, laser or water jet cutting. The processed blank may also be formed via a stamping operation, or any other means that separates the tab outline from the thin sheet of foil material. In some embodiments, additional processing steps to vary the thickness of a plurality of regions of the thin foil material may be performed prior to, or after the tab outlines are produced.

Figure 27:
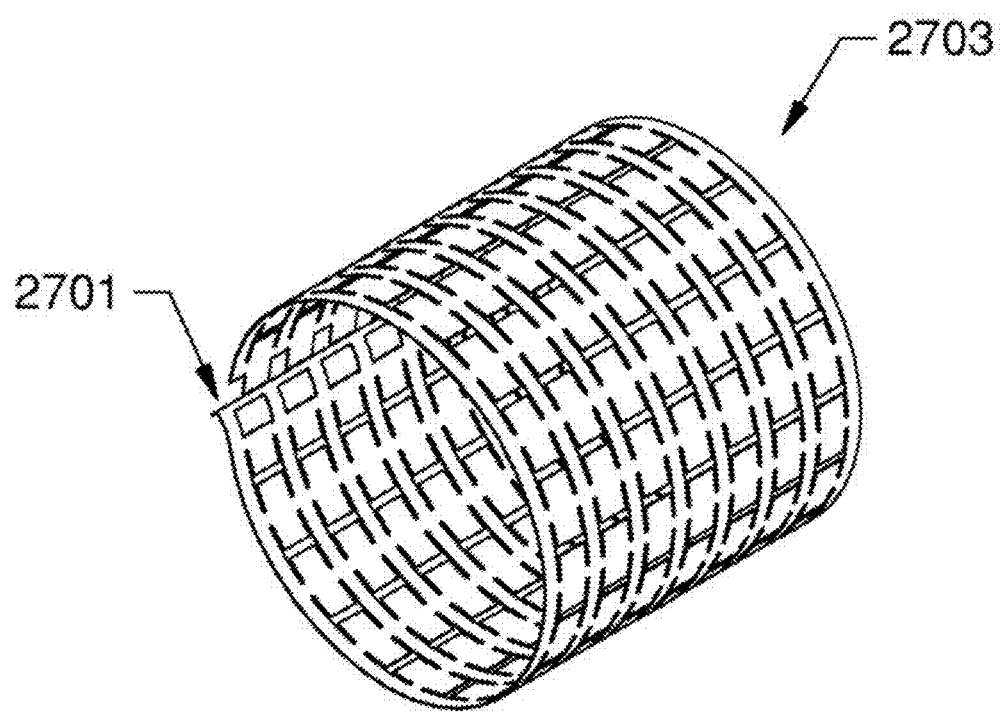
FIG. 27 depicts one embodiment of a wing foil blank after forming it into a generally cylindrical shape according to the present approach.
Figure 28:
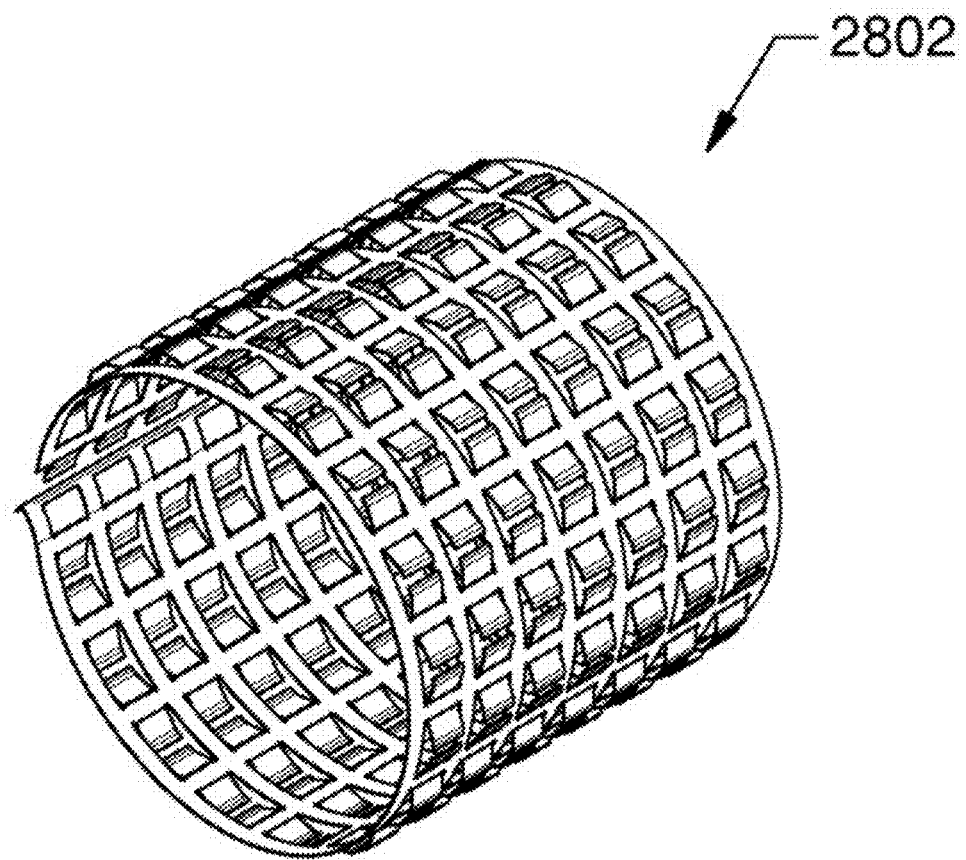
FIG. 28 depicts one embodiment of a wing foil blank after forming the tabs to create a cylindrical wing foil layer according to the present approach.

FIG. 27 illustrates the result of a next step, which is rolling the wing foil blank of FIG. 26 into a generally cylindrical shape. FIG. 27 also shows a retaining feature 2701, suitable for being inserted into a narrow, profiled housing slot formed at one end of the wing foil blank. Although shown in the context of the rolling operation, the additional forming step may occur at other points in the manufacturing process. FIG. 28 illustrates the results of the next step, which is to simultaneously or sequentially bend all of the tabs 2802 to the free-state bends which create the desired profile. This step can be accomplished, for example, by high pressure hydroforming in a profiled die. Other processes such as, for example, stamping, electroforming and additive machining (i.e., 3D printing) may be used to perform one or more of the manufacturing steps.

Figure 29:
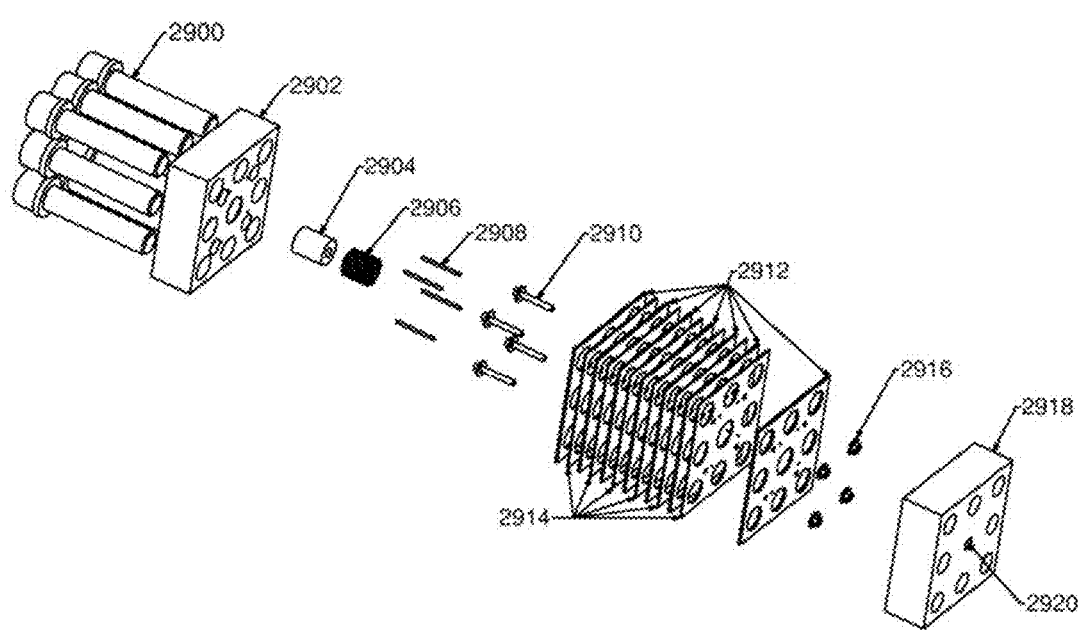
FIG. 29 depicts one embodiment of a hydroforming die for manufacturing one embodiment of a wing foil layer according to the present approach.
Figure 30:
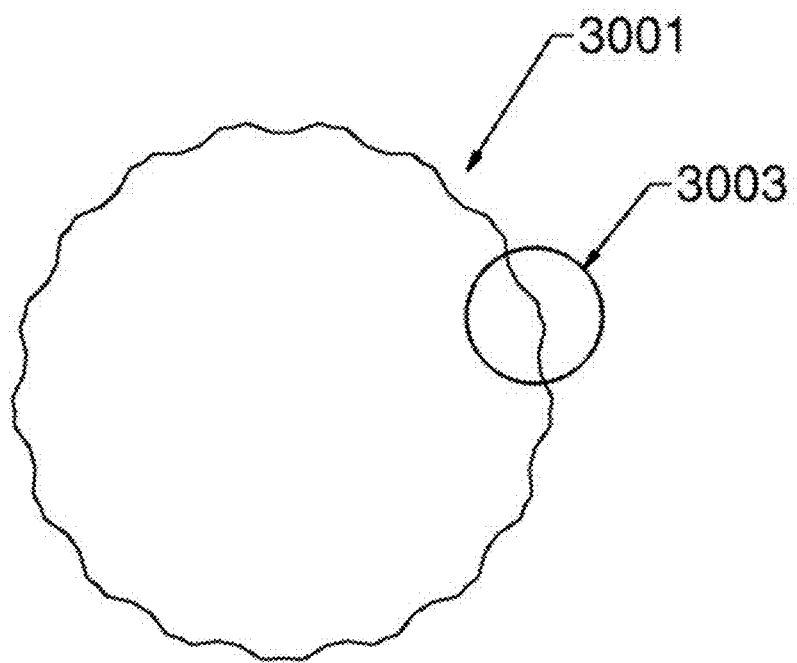
FIG. 30 depicts one embodiment of a profile of a plate suitable for a hydroforming die for manufacturing a wing foil bearing according to an embodiment of the present approach.

FIGS. 29 and 30 show one embodiment of a profiled die suitable for the hydroforming operation described above. The major components of the die are a thick metal top plate 2902, a stack of thinner plates comprised of alternating layers of plates 2912 and 2914, and a thick bottom plate 2918. Plate 2918 has a through-hole 2920 to provide a means to introduce very high pressure fluid into the die cavity to perform the forming operation. In the embodiment shown, the overall assembly is held together by a set of bolts 2900 that are strong enough to resist the separating force induced by very high pressure fluid. Other embodiments may use alternative means of clamping, such as, for example and without limitation, a hydraulic arbor press or a steel frame with clamping wedges. Each plate 2912 and 2914 in the stack of thinner plates has a central hole, such that the center holes in the stack of plates combine to create a cavity matching the desired formed, free-state shape of the wing foil bearing, with some allowance for the springback which occurs after forming the free-state bends. The stack of thinner plates consists of alternating plates 2914 with a circular hole, and plates 2912 with a profiled hole. FIG. 30 shows an example of a profiled hole shape 3001 for a profiled plate. The pattern 3003 for the embodiment shown produces two free-state bends similar to the cantilever tabs shown in FIG. 1. The profiled plates form the wing foil tabs, while the circular hole plates form the frames. Other embodiments may have more than two plate designs to produce a plurality of free-state bends and profiles. Embodiments where no two of the plates have the same profile or thickness are possible. Other embodiments with profiled plates that form non-circular frames may be used for non-circular configurations. Other embodiments where the stack of profiled plates are fully enclosed by an outer housing are possible. For example, some embodiments, the thin plates 2912 and 2914 may be thin walled, generally circular rings stacked within in generally cylindrical hole in a single thick plate.

For the embodiment shown, the plate thicknesses may be selected such that the thickness of a profiled plate is slightly more than the width of the corresponding circular array of wing foil tabs. For example, the profiled plate thickness for the embodiment shown in FIG. 2 may be W1+W3/2. The thickness of the plate with the circular hole is slightly more than the width of the corresponding frame. Taking the embodiment shown in FIG. 2 as an example, the thickness would be W2+W3/2. Embodiments with varying plate thicknesses, as well as different profiles on one or more plates may have advantages for some applications. In FIG. 29, the plate subassembly is shown as being held together by bolts 2910 and nuts 2916, and pins 2908. One of ordinary skill in the art would understand that other means of maintaining alignment and relative location during assembly are possible. Embodiments that form partial arc and/or non-circular wing foil bearings are possible.

The pre-rolled wing foil blank 2906 and a tight fitting elastomer plug 2904 can be inserted into the die cavity and the die components clamped between the top and bottom plate. Elastomer plugs, optionally with a center hole extending along some or all of the length of the plug's generally circular axis from one or both ends, may be used. High pressure fluid can then be introduced via through-hole 2920 to expand the elastomeric plug and thereby press the wing foil tabs into the profiled die plate cavities. One of ordinary skill in the art would understand that other die embodiments and means of introducing the high pressure fluid are possible. For example, other embodiments may have a metal cylinder in the center of the die to define the inner surface of an annular region of high pressure fluid. These embodiments are advantageous for reducing the area of the high pressure fluid acting against the top and bottom plate, and thus reducing the separating force. This embodiment may be especially advantageous when producing large wing foil bearings. The operation described herein forms the free-state bends in the two-dimensional array of wing foil cantilever tabs in a single, economic forming operation. The hydroforming operation described herein is accurate, economical, and repeatable for forming wing foil layers as described herein. An embodiment of a similar hydroforming technique using a flat plate die with contoured recesses may be used for generally planar wing foil bearings.

Figure 31:
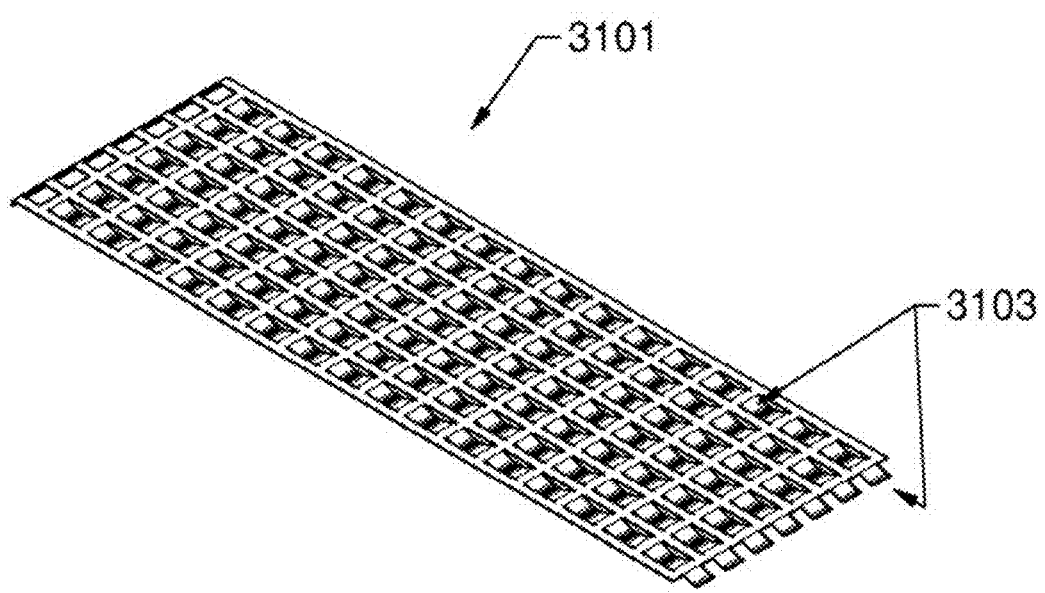
FIG. 31 depicts a generally planar wing foil layer after forming the wing foil tabs according to an embodiment of the present approach.
Figure 32:
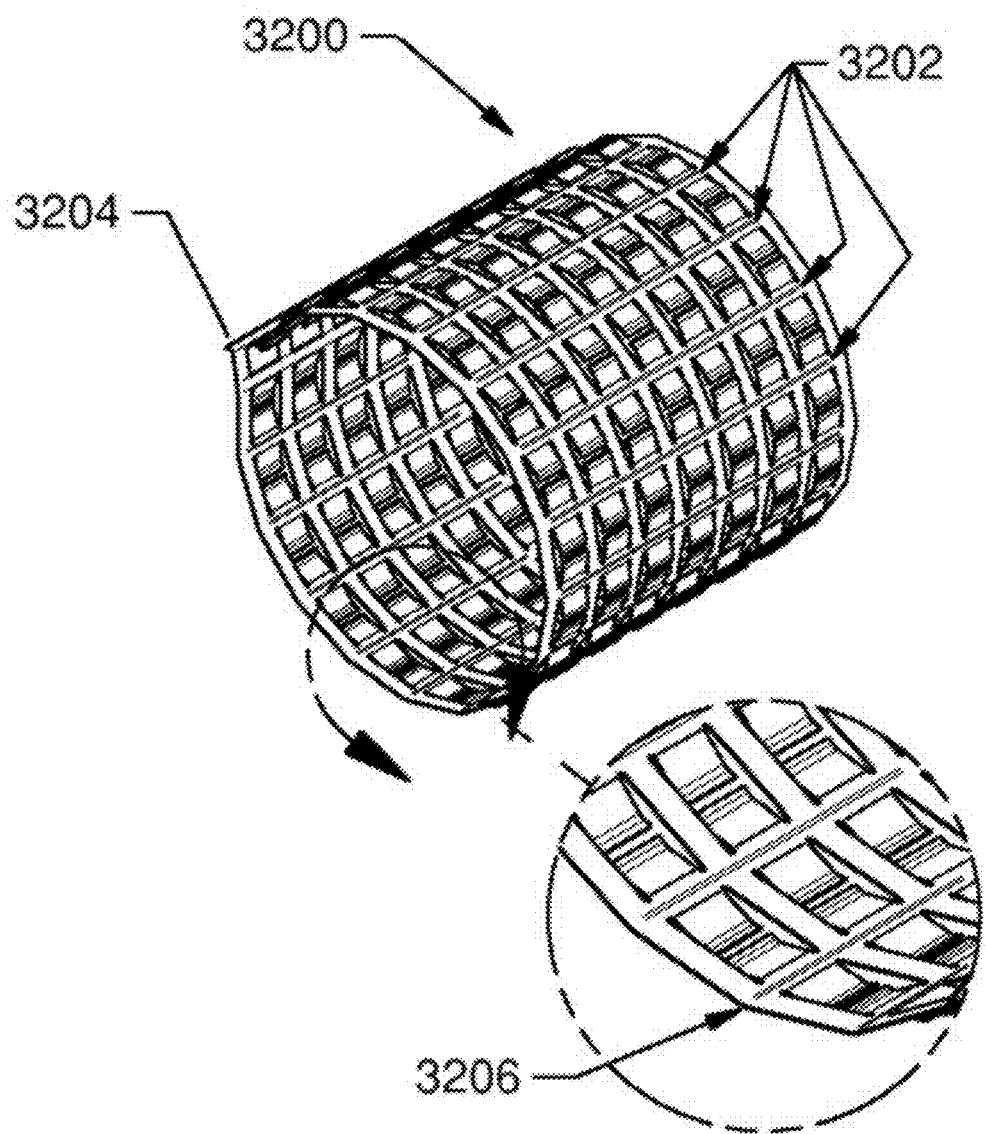
FIG. 32 depicts one embodiment of a wing foil layer after forming a series of bends to create a generally cylindrical wing foil bearing according to the present approach.

FIGS. 31 and 32 show another process for manufacturing a cylindrical wing foil layer. The process starts with the same steps as outlined previously to produce the generally planar array of unformed tabs shown in FIG. 26. FIG. 31 illustrates forming all or a portion of the wing cantilever tab free-state bends in this generally planar configuration. This operation may be achieved, for example, via a stamping or hydroforming operation on the flat blank. Other means of creating this flat, formed blank are possible, including for example, and without limitation, stamping, electroforming and additive machining (i.e., 3D printing).

FIG. 32 illustrates the result of progressively performing a series of free-state bends 3202 in the web region so as to result in a faceted approximation of the circular wing foil bearing previously illustrated in FIG. 28. The expanded view of the fully formed structure shows the free-state bends 3206 in more detail. FIG. 32 also illustrates the result of an optional additional step, wherein a retaining feature 3204 suitable for being inserted into a narrow, profiled slot cut into a housing has been formed via bending the end of the wing foil blank during the manufacturing process. Other embodiments may have a different retaining feature than shown. Some of these steps may be combined. For example, if the tabs are cut-out with a stamping operation, the same operation might also bend them to the desired angle. Alternatively, the tab bending operation might be combined with the operating of forming the small bends in the web region which result in a faceted approximation of a generally circular two-dimensional array of wing foil cantilever tabs.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present approach may be embodied in other specific forms without departing from the spirit or essential characteristics thereof. The present embodiments are therefore to be considered in all respects as illustrative and not restrictive, the scope of the present approach being indicated by the claims of the application rather than by the foregoing description, and all changes which come within the meaning and range of equivalency of the claims are therefore intended to be embraced therein.

We claim:

1. A wing foil bearing comprising:
a mounting surface layer;
a first tab foil layer comprising a first material defining a first array of cantilever tabs, each cantilever tab having: (i) an integral edge integral with the first material, (ii) a free edge substantially opposite the integral edge, (iii) a first free-state bend along the integral edge bending the tab away from the mounting surface layer, (iv) a second free-state bend between the first free-state bend and the free edge bending in an opposite direction to the first free-state bend, (v) a third free-state bend between the second free-state bend and the free edge and bending in an opposite direction to the first free-state bend, and (vi) a contact surface extending between the second free-state bend and the third free-state bend; and
a counter-surface layer cooperatively engaged with at least a portion of the first two-dimensional array of cantilever tabs;
wherein the second free-state bend and the third free-state bend are configured such that at rest, the third free-state bend engages the counter-surface layer and a gap is present between the second free-state bend and the counter-surface layer.

2. The wing foil bearing of claim 1, wherein the second free-state bend and the third free-state bend are configured such that upon the application of a threshold force on the mounting surface layer, the second free-state bend engages the counter-surface layer.

3. The wing foil bearing of claim 1, wherein the cantilever tabs in the first array of cantilever tabs are formed in pairs, such the tabs in a pair have adjacent integral edges.

4. The wing foil bearing of claim 3, wherein the integral edges in each pair are substantially the same width.

5. The wing foil bearing of claim 3, wherein the cantilever tabs in each pair are substantially mirror images of each other.

6. The wing foil bearing of claim 1, wherein the first array of cantilever tabs is one of a regularly spaced array, an irregularly spaced array, a rectangular array, a square array, a rhombic array, a hexagonal array, a parallelogrammic array, a triangular array, and a circular array.

7. The wing foil bearing of claim 1, wherein the wing foil bearing is one of a generally flat planar bearing, a generally curved planar bearing, a generally cylindrical bearing, a generally conical bearing, a generally spherical bearing, and a generally hemispherical bearing.

8. The wing foil bearing of claim 1, wherein the first tab foil layer comprises a second array of cantilever tabs, each cantilever tab in the second array having: (i) an integral edge integral with the first material, and (ii) a free edge substantially opposite the integral edge.

9. The wing foil bearing of claim 8, wherein each cantilever tab in the second array of cantilever tabs comprises a free-state bend along the integral edge bending the tab in the same direction as the first free-state bend.

10. The wing foil bearing of claim 1, further comprising a second tab foil layer comprising a second material defining a plurality of cantilever tabs, each cantilever tab having: (i) an integral edge integral with the second first material, and (ii) a free edge substantially opposite the integral edge.

11. The wing foil bearing of claim 10, wherein at least a portion of the second tab foil layer is nested with at least a portion of the first tab foil layer.

12. The wing foil bearing of claim 11, wherein at least one cantilever tab of the second tab foil layer is in contact with at least one cantilever tab in the first array of cantilever tabs.

13. The wing foil bearing of claim 10, wherein each cantilever tab in the plurality of cantilever tabs of the second tab foil layer has a free-state bend along the integral edge bending the tab in the same direction as the first free-state bend of the first array of cantilever tabs.

14. The wing foil bearing of claim 10, wherein each cantilever tab in the plurality of cantilever tabs of the second tab foil layer has (i) a proximal free-state bend along the integral edge bending the tab away from the mounting surface layer, (ii) a distal free-state bend between the proximal free-state bend and the free edge bending in an opposite direction to the proximal free-state bend, and (iii) a medial free-state bend between the distal free-state bend and the free edge and bending in an opposite direction to the proximal free-state bend, and (iv) a contact surface extending between the medial free-state bend and the distal free-state bend.

15. A wing foil bearing comprising:
a mounting surface layer;
a first tab foil layer comprising a first material defining a first array of cantilever tabs, each cantilever tab having: (i) an integral edge integral with the first material, (ii) a free edge substantially opposite the integral edge, (iii) a first free-state bend along the integral edge bending the tab away from the mounting surface layer, (iv) a second free-state bend between the first free-state bend and the free edge bending in an opposite direction to the first free-state bend; and
a counter-surface layer cooperatively engaged with at least a portion of the first array of cantilever tabs;
the first array of cantilever tabs comprises a first plurality having a first effective height from the integral edge to the counter-surface at rest, and a second plurality having a second effective height from the integral edge to the counter-surface at rest, the first effective height being less than the second effective height;
wherein at least one of the first plurality and the second plurality comprises at least one of (a) at least one tab pair, the tabs in said tab pair having adjacent integral edges and (b) a two-dimensional array of cantilever tabs.

16. The wing foil bearing of claim 15, wherein the first effective height and the second effective height are configured such that (1) at rest, the second plurality of cantilever tabs is cooperatively engaged with the counter-surface layer, and (2) upon the application of a threshold force on the mounting surface layer, the first and second pluralities of cantilever tabs are cooperatively engaged with the counter-surface layer.

17. The wing foil bearing of claim 15, wherein at least a portion of the cantilever tabs in at least one of the first array and the second array comprises a third free-state bend between the second free-state bend and the free edge in an opposite direction to the first free-state bend.

18. The wing foil bearing of claim 15, further comprising a second tab foil layer comprising a second material defining a plurality of cantilever tabs, each cantilever tab having: (i) an integral edge integral with the second material, and (ii) a free edge substantially opposite the integral edge.

19. The wing foil bearing of claim 18, wherein at least a portion of the second tab foil layer is nested with at least a portion of the first tab foil layer.

20. The wing foil bearing of claim 18, wherein at least a portion of the plurality of cantilever tabs of the second tab foil layer protrude through the first tab foil layer.

21. The wing foil bearing of claim 15, wherein the cantilever tabs in the first array of cantilever tabs are formed in pairs, such the tabs in a pair have adjacent integral edges.

* * * * *